US012562674B2

(12) United States Patent
Gallegos et al.

(10) Patent No.: US 12,562,674 B2
(45) Date of Patent: Feb. 24, 2026

(54) ROOF INTERFACE WITH SEALANT INJECTION PORTS

(71) Applicant: Unirac Inc., Albuquerque, NM (US)

(72) Inventors: Ernest Gallegos, Albuquerque, NM (US); Todd Ganshaw, Albuquerque, NM (US)

(73) Assignee: Unirac, Inc., Albuquerque, NM (US)

( * ) Notice: Subject to any disclaimer, the term of this patent is extended or adjusted under 35 U.S.C. 154(b) by 213 days.

(21) Appl. No.: 18/356,969

(22) PCT Filed: Feb. 3, 2022

(86) PCT No.: PCT/US2022/015136
§ 371 (c)(1),
(2) Date: Jul. 21, 2023

(87) PCT Pub. No.: WO2022/169989
PCT Pub. Date: Aug. 11, 2022

(65) Prior Publication Data
US 2024/0297609 A1 Sep. 5, 2024

Related U.S. Application Data

(60) Provisional application No. 63/145,280, filed on Feb. 3, 2021.

(51) Int. Cl.
*H02S 20/23* (2014.01)
*F24S 25/00* (2018.01)
(Continued)

(52) U.S. Cl.
CPC .............. *H02S 20/23* (2014.12); *F24S 25/61* (2018.05); *F24S 25/636* (2018.05); *F24S 25/65* (2018.05);
(Continued)

(58) Field of Classification Search
CPC .......... F24S 25/61; F24S 25/65; F24S 25/636; F24S 2025/021; F24S 2025/6003;
(Continued)

(56) References Cited

U.S. PATENT DOCUMENTS 6,536,729 B1 * 3/2003 Haddock ................. E04D 3/362
52/204.55
8,387,319 B1 * 3/2013 Gilles-Gagnon ....... F24S 25/33
52/173.3

(Continued)

OTHER PUBLICATIONS

The International Search Report and Written Opinion for PCT Application No. PCT/US22/15136, mailed Apr. 26, 2022, 11 pages.

(Continued)

*Primary Examiner* — Jessie T Fonseca
(74) *Attorney, Agent, or Firm* — Lee & Hayes, P.C.

(57) ABSTRACT

A mounting system includes a mounting device. The mounting device includes an internal cavity defined in a side of the mounting device, a first sealant aperture defined in the mounting device and opening into the internal cavity, a second sealant aperture defined in the mounting device and opening into the internal cavity, the first sealant aperture and the second sealant aperture being in fluid communication when the mounting device is placed on a surface for use, and a fastener aperture defined through the internal cavity. The mounting system further includes a coupling bracket including a bottom portion, an underside surface of which is correspondingly shaped in conformance with a shape of an outer surface of a central portion of the mounting device so as to be accommodated thereon when in use, and a fastener to couple the mounting device and the coupling bracket together via the fastener aperture.

19 Claims, 16 Drawing Sheets

(51) Int. Cl.

| | |
|---|---|
| *F24S 25/61* | (2018.01) |
| *F24S 25/636* | (2018.01) |
| *F24S 25/65* | (2018.01) |
| *H02S 30/00* | (2014.01) |
| *F24S 25/60* | (2018.01) |

(52) U.S. Cl.
CPC ......... *H02S 30/00* (2013.01); *F24S 2025/021* (2018.05); *F24S 2025/6003* (2018.05); *F24S 2025/6004* (2018.05); *F24S 2025/6005* (2018.05)

(58) Field of Classification Search
CPC ...... F24S 2025/6004; F24S 2025/6005; H02S 20/23; H02S 30/00
See application file for complete search history.

(56) References Cited

U.S. PATENT DOCUMENTS

| | | | | |
|---|---|---|---|---|
| 8,756,881 | B2 * | 6/2014 | West | F24S 25/40 |
| | | | | 52/173.3 |
| 8,931,989 | B2 * | 1/2015 | Stephan | F16J 15/14 |
| | | | | 411/371.1 |
| 9,496,820 | B2 * | 11/2016 | Seery | F24S 25/61 |
| 9,912,284 | B2 * | 3/2018 | Svec | F24S 25/632 |
| 10,135,387 | B2 | 11/2018 | Seery et al. | |
| 10,148,217 | B2 * | 12/2018 | Meine | E04D 13/00 |
| 10,171,026 | B2 * | 1/2019 | Meine | H02S 20/23 |
| 10,767,684 | B1 * | 9/2020 | Meine | E04D 15/04 |
| 11,085,484 | B2 * | 8/2021 | Feldmann | F16B 5/0275 |
| 11,515,831 | B2 * | 11/2022 | Affentranger, Jr. | F16J 15/14 |
| 12,000,428 | B2 * | 6/2024 | Feldmann | F16J 15/14 |
| 2011/0152133 | A1 | 6/2011 | Sanders et al. | |
| 2011/0227298 | A1 * | 9/2011 | Teng | E04B 1/66 |
| | | | | 277/645 |
| 2013/0133270 | A1 * | 5/2013 | West | H10F 19/804 |
| | | | | 52/705 |
| 2016/0040431 | A1 * | 2/2016 | Stanley | F24S 25/61 |
| | | | | 52/741.4 |
| 2016/0134230 | A1 | 5/2016 | Meine et al. | |
| 2016/0226435 | A1 * | 8/2016 | Almy | F24S 25/636 |
| 2016/0248367 | A1 * | 8/2016 | Almy | F24S 25/00 |
| 2016/0248368 | A1 * | 8/2016 | Seery | F24S 25/61 |
| 2016/0248369 | A1 | 8/2016 | Almy | |
| 2017/0025986 | A1 * | 1/2017 | Almy | F24S 25/634 |
| 2017/0108165 | A1 * | 4/2017 | Svec | F24S 25/61 |
| 2017/0279403 | A1 | 9/2017 | Seery et al. | |
| 2018/0048261 | A1 * | 2/2018 | Franklin | H02S 30/10 |
| 2018/0062560 | A1 | 3/2018 | Stephan et al. | |
| 2018/0087558 | A1 * | 3/2018 | Feldmann | F24S 25/33 |
| 2018/0106289 | A1 * | 4/2018 | Ash | F24S 25/613 |
| 2018/0152133 | A1 | 5/2018 | Schaefer et al. | |
| 2018/0167023 | A1 * | 6/2018 | Meine | H02S 20/23 |
| 2018/0238589 | A1 * | 8/2018 | Ash | H02S 20/23 |
| 2019/0093340 | A1 * | 3/2019 | Meine | E04B 1/6801 |
| 2019/0131917 | A1 | 5/2019 | Tomolillo | |
| 2020/0116191 | A1 * | 4/2020 | Uppu | H02S 20/00 |
| 2020/0309184 | A1 | 10/2020 | Schuit et al. | |
| 2020/0378110 | A1 | 12/2020 | Meine | |
| 2021/0285596 | A1 * | 9/2021 | Affentranger, Jr. | F16M 13/02 |
| 2022/0243754 | A1 | 8/2022 | Gallegos et al. | |
| 2025/0102008 | A1 | 3/2025 | Gallegos | |

OTHER PUBLICATIONS

The International Preliminary Report on Patentability mailed Aug. 17, 2023 for PCT Application No. PCT/US22/13995, 9 pages.
Search Report and Written Opinion for European Application No. 22750399.2, Dated Dec. 3, 2024, 8 pages.

* cited by examiner

500

502

114

204

118

126

102

208

106

206  210

114

518

116

506

202

124

100

508

504

112

104

116

120

900

910

912

926

920-1
916-1
920-2
916-2
920-3
916-3
920-4
916-4
920-N
916-N

904

922-1
918-1
922-2
918-2
922-3
918-3
922-4
918-4
922-N
918-N

928

106

902

118    102    908    914

906

1200

1106

910

912

920-N
916-N

922-N
918-N

1108

1108

1102

1102

1102

1102

1104

1202

1500

1506

1508

1504

1106

1402

800

ROOF INTERFACE WITH SEALANT INJECTION PORTS

RELATED APPLICATION

This non-provisional application claims the benefit of PCT international application No. PCT/US2022/015136 filed Feb. 3, 2022, which, in turn, claims the benefit of U.S. Provisional Application No. 63/145,280, filed Feb. 3, 2021, the contents of which are both incorporated in its entirety herein by reference.

BACKGROUND

In many applications, a coupling device may be secured to a structure such as, for example, a roof of a residence or commercial building. The coupling device may be used to secure devices that are to, in turn, be secured to the structure such as, for example, photovoltaic panels. However, the fasteners used to couple the brackets to the structure also create a hole in the structure. Without flashing or other measures, the hole created by the fastener may cause fluids such as precipitation that may fall on the exterior of the structure to seep into the interior of the structure.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Overview

Figure 1:
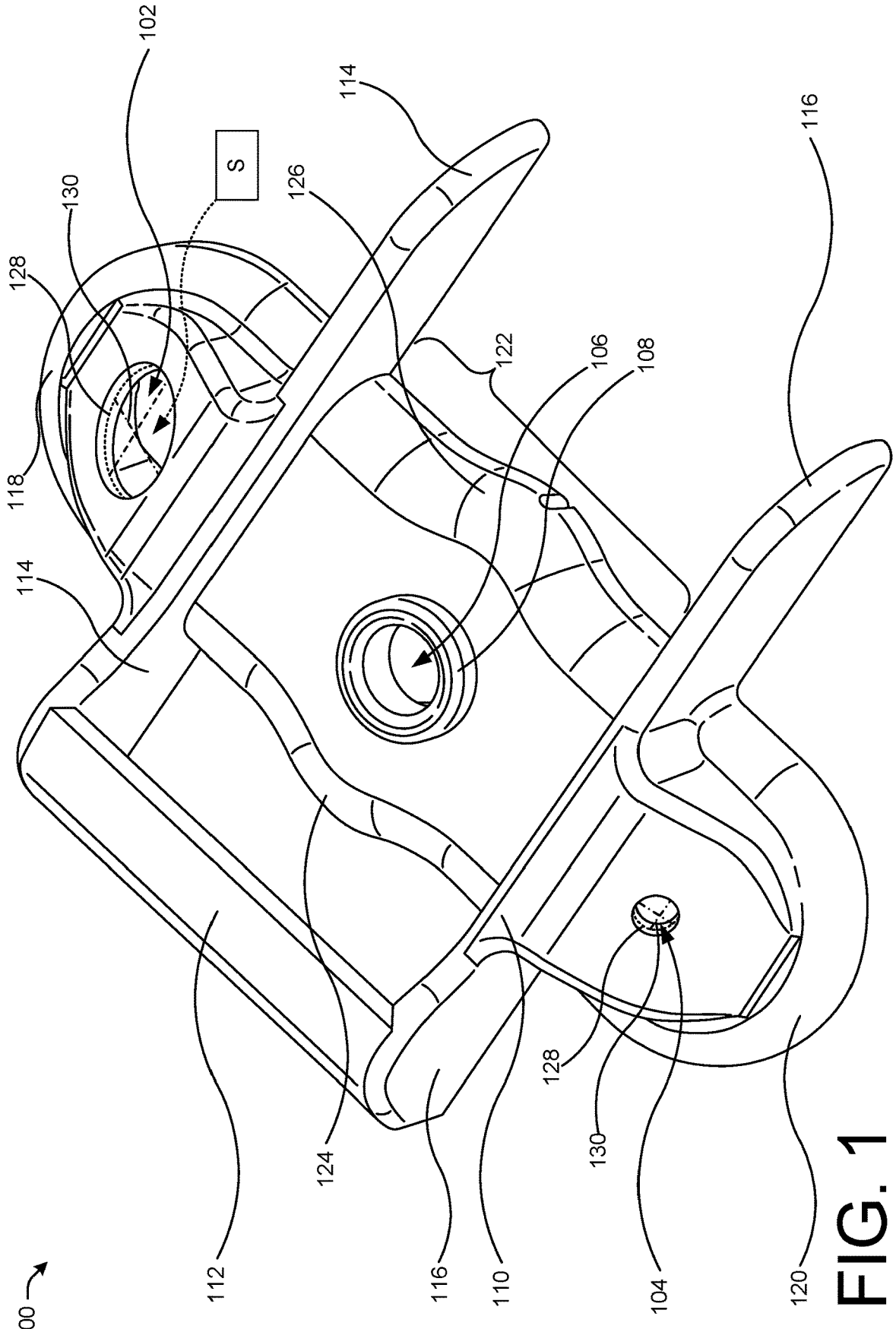
FIG. 1 illustrates a top, perspective view of a mounting device, according to an example of the principles described herein.

In the examples described herein, a mounting system may be used to couple a number of structure-mounted devices such as, for example, rails, photovoltaic panel assemblies and other devices. The mounting device provides for a scalable mounting device that may be coupled to a structure using a fastener that penetrates into the structure and is scalable via the insertion of a sealant into a cavity defined in the mounting device and that may penetrate and seal any hole created by the fastener penetrating the structure.

Examples described herein provide a mounting system including a mounting device. The mounting device may include an internal cavity defined in a side of the mounting device, a first sealant aperture defined in the mounting device and opening into the internal cavity, and a second sealant aperture defined in the mounting device and opening into the internal cavity. The first sealant aperture and the second sealant aperture may be in fluid communication when the mounting device is placed on a surface for use. The mounting device may further include a fastener aperture defined through the internal cavity. The mounting system may further include a coupling bracket. The coupling bracket may include a bottom portion, an underside surface of which is correspondingly shaped in conformance with a shape of an outer surface of a central portion of the mounting device so as to be accommodated thereon when in use, and a fastener to couple the mounting device and the coupling bracket together via the fastener aperture.

The mounting device may further include a first distended portion and a second distended portion. The bottom portion of the coupling bracket may include a first ridge and a second ridge formed on a raised bridge portion. The first ridge and the second ridge may engage with the first distended portion and the second distended, respectively, to secure the coupling bracket to the mounting device.

The coupling bracket may further include a vertical device coupling portion including a bracket aperture defined therethrough. The bottom portion of the coupling bracket may further include a fastener aperture disposed to align with the fastener aperture in the mounting device. The fastener aperture in the bottom portion of the coupling bracket and the fastener aperture in the mounting device may be sized to receive the fastener for coupling the mounting device and the coupling bracket to the structure. The first sealant aperture may be configured to receive a sealant material. The second sealant aperture may be configured to expel the sealant material through the second sealant aperture when the sealant material fills the internal cavity with the sealant material. The sealant material seals around the fastener with respect to a structure to which the mounting system is secured via the fastener.

The coupling bracket may further include a clamp that is adjustably coupled along a height of the coupling bracket. The coupling bracket further includes a bottom portion, a first stanchion coupled to the bottom portion, a second stanchion coupled to the bottom portion opposite the first stanchion and rotatably coupled to the bottom portion, and a spring biasing the second stanchion towards the first stanchion. The spring may be formed on the mounting device.

The coupling bracket further includes a retention housing, a nut defined within the retention housing, a cylindrical stanchion threadingly coupled to the nut, and a spring-biased clamp coupled to the cylindrical stanchion. Adjustment of the cylindrical stanchion relative to the nut adjusts an elevation of the spring-biased clamp relative to the mounting device. The mounting device may be made of a plastic material. The mounting system may further include a flashing located between the mounting device and the structure, wherein the fastener engages with the structure via the flashing.

Examples described herein provide a mounting device for mounting to a structure. The mounting device may include an internal cavity defined in a side of the mounting device, a first sealant aperture defined in the mounting device and opening into the internal cavity, a second sealant aperture defined in the mounting device and opening into the internal cavity, the first sealant aperture and the second sealant aperture being in fluid communication when the mounting device is placed on a surface for use, a fastener aperture defined through the internal cavity, and a fastener to couple the mounting device to a structure via the fastener aperture. The mounting device may further include a first distended portion and a second distended portion formed on the mounting device, the first distended portion and the second distended portion being shaped to engage with a first ridge and a second ridge formed on a raised portion of a coupling bracket, the coupling bracket to engage with the mounting device. The first distended portion and the second distended portion may engage with the first ridge and the second ridge to secure the coupling bracket to the mounting device. The first sealant aperture may be configured to receive a sealant material.

The second sealant aperture may be configured to expel the sealant material through the second sealant aperture when the sealant material fills the internal cavity with the sealant material. The sealant material seals the fastener with respect to the structure. At least one of the first sealant aperture and the second sealant aperture comprises a rescalable membrane. The second sealant aperture may be smaller in diameter relative to the first sealant aperture.

An internal cavity defined in a bottom side of the mounting device, a first sealant aperture defined in the mounting device and opening into the internal cavity, and a second sealant aperture defined in the mounting device and opening into the internal cavity. The first sealant aperture and the second sealant aperture may be in fluid communication. The mounting device may further include a coupling means to couple the mounting system to a structure.

The mounting device may further include an interface portion formed on the mounting device. The interface portion secures a bracket to the mounting device at a location of the mount. The bracket includes a first portion and a second portion that interface with a surface of the structure. Further, the bracket includes a raised portion between the first portion and the second portion that fits over a center portion of the mounting device. The raised portion of the bracket includes a first ridge located at an interface of the first portion and the raised portion, and a second ridge located at an interface of the second portion and the raised portion. The first ridge and the second ridge assist in coupling the mounting device to the bracket. Specifically, as the mounting device and the bracket are coupled together, the first ridge and the second ridge may move past a center portion of the mounting device. The center portion of the mounting device may include two distended portions. These distended portions are at least partially rounded such that as the first ridge and the second ridge may move past the distended portions during coupling of the mounting device and bracket, the first ridge and the second ridge of the bracket retain the center portion within the raised portion of the bracket and cause the mounting device and the bracket to be mechanically engaged via an engineering fit in this manner.

A bracket aperture is defined in the raised portion of the bracket. The mounting device further includes a first fastener aperture defined in the mounting device. The bracket further includes a second fastener aperture defined in the bracket. The first fastener aperture and the second fastener aperture receive the coupling means for coupling the mounting device and the bracket to the structure.

The first sealant aperture is configured to receive a sealant material. The second sealant aperture is configured to expel the sealant material through the second sealant aperture when the sealant material fills the internal cavity with the sealant material. The sealant material seals the coupling means to the structure.

The bracket may further include a clamp coupled to the bracket. The clamp may be adjustably coupled along a height of the bracket.

The bracket may further include a bottom portion, a first stanchion coupled to the bottom portion, a second stanchion coupled to the bottom portion opposite the first stanchion and rotatably coupled to the bottom portion, and a spring biasing the second stanchion towards the first stanchion. In one example, a spring is formed on the mounting device.

The bracket may further include a retention housing, a nut defined within the retention housing, a height adjustment bolt threadingly coupled to the nut, and a spring-biased clamp coupled to the height adjustment bolt. Adjustment of the height adjustment bolt relative to the nut adjusts the elevation of the spring-biased clamp relative to the mounting device.

In one example, the mounting device may be made of a plastic material. The mounting system may further include a flashing located between the mounting device and the structure, wherein the fastener engages with the structure via the flashing. Further, examples described herein also provide a method and a mounting system as shown and described.

Additionally, the techniques described in this disclosure may be performed as a method and/or may form part of a larger system.

Example Embodiments

Figure 2:
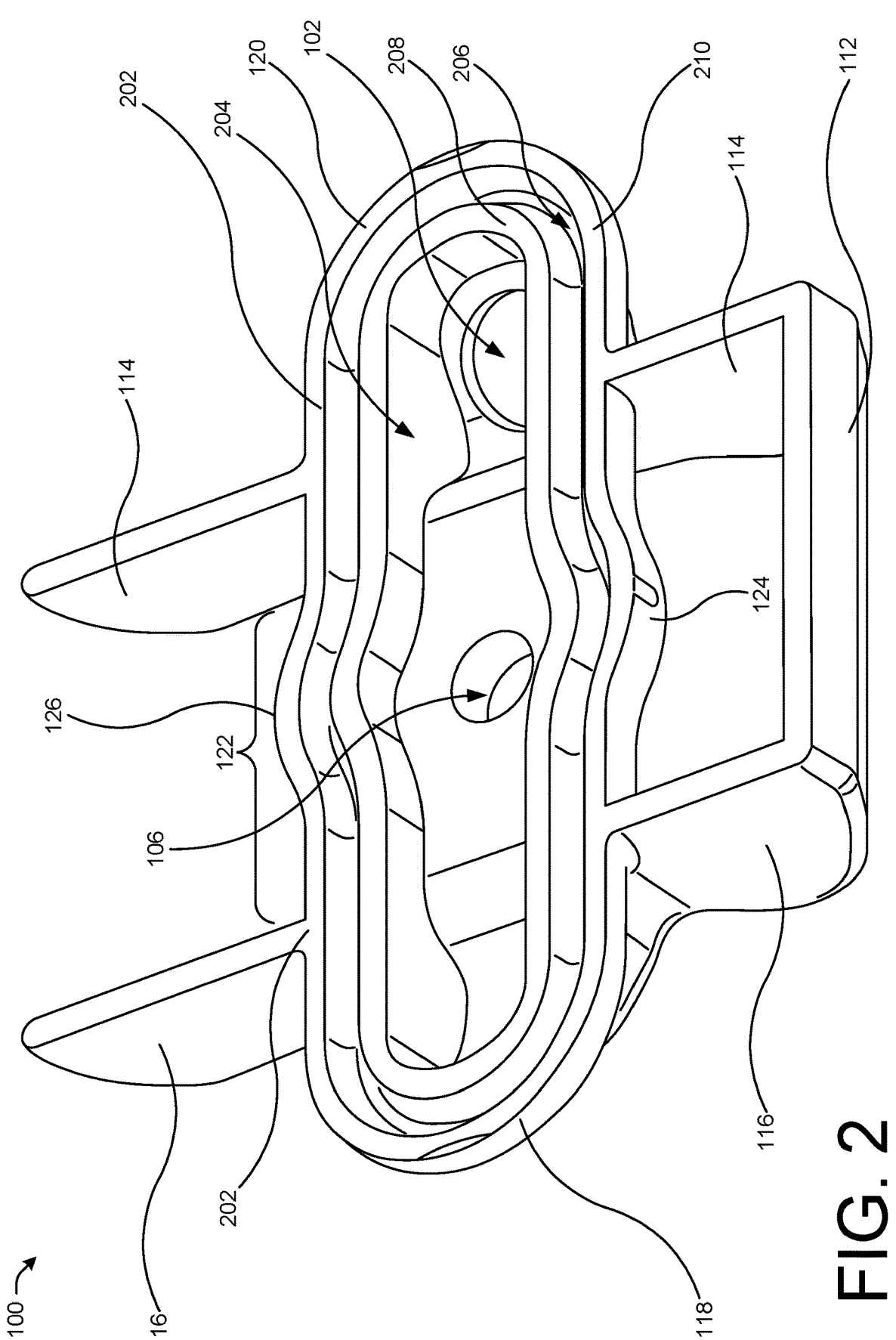
FIG. 2 illustrates a bottom, perspective view of the mounting device of FIG. 1, according to an example of the principles described herein.
Figure 3:
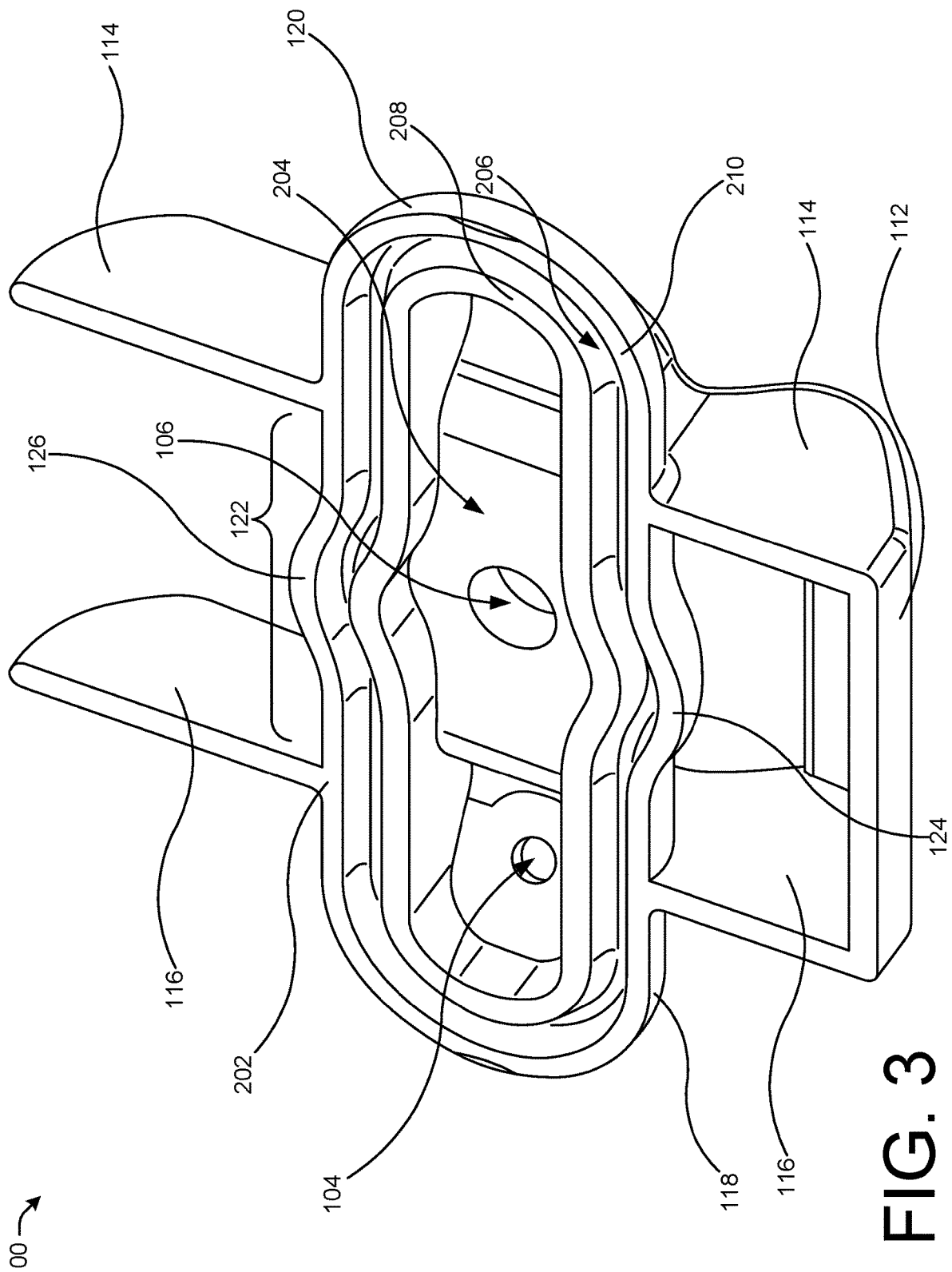
FIG. 3 illustrates a bottom, perspective view of the mounting device of FIG. 1, according to an example of the principles described herein.
Figure 4:
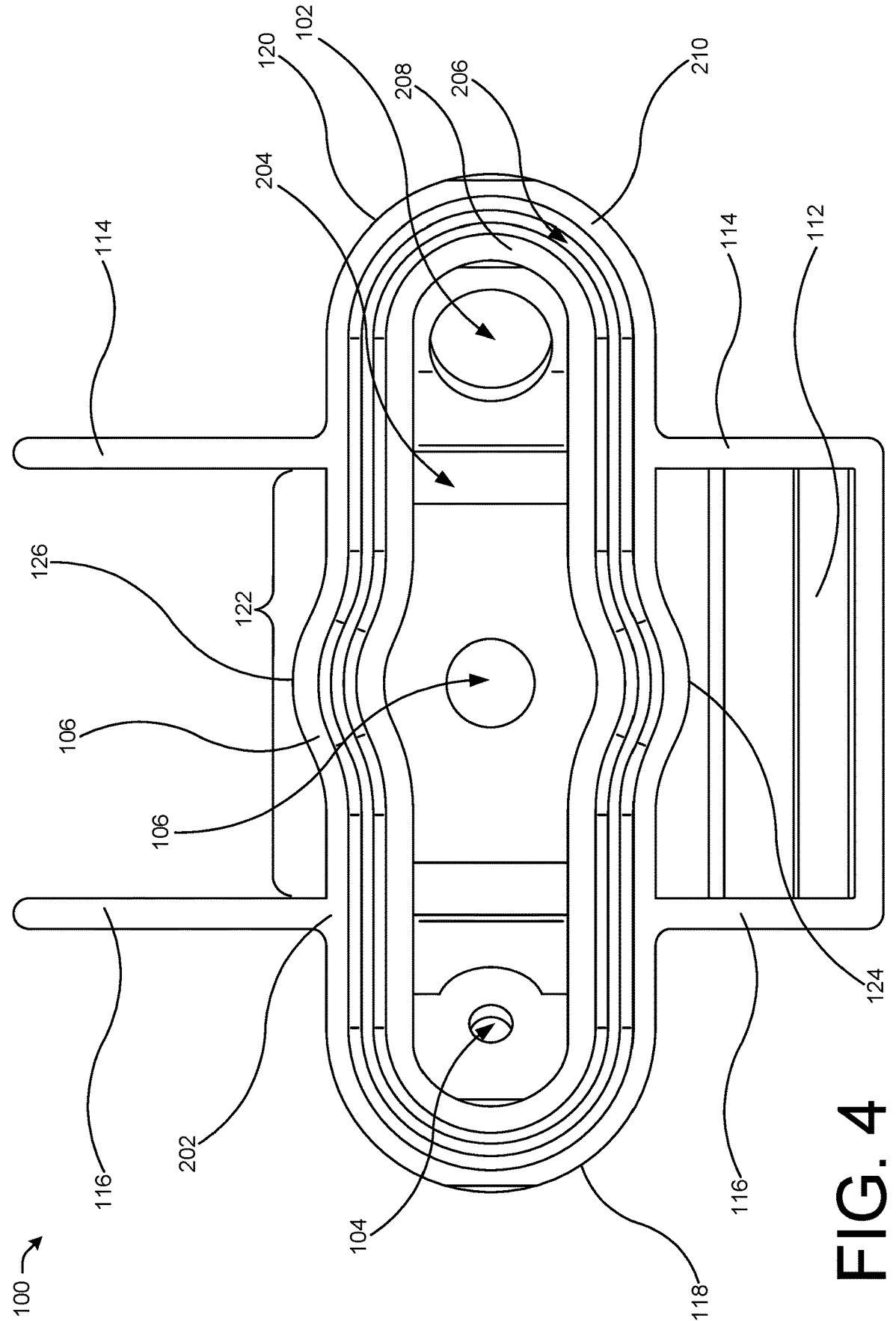
FIG. 4 illustrates a bottom, plan view of the mounting device of FIG. 1, according to an example of the principles described herein.

Turning now to the figures, FIG. 1 illustrates a top, perspective view of a mounting device 100, according to an example of the principles described herein. FIG. 2 illustrates a bottom, perspective view of the mounting device 100 of FIG. 1, according to an example of the principles described herein. FIG. 3 illustrates a bottom, perspective view of the mounting device 100 of FIG. 1, according to an example of the principles described herein. FIG. 4 illustrates a bottom, plan view of the mounting device 100 of FIG. 1, according to an example of the principles described herein. FIGS. 1-4 depict the mounting device 100 without any brackets or other devices coupled thereto. The mounting device 100 includes a mounting device 100. In one example, the mounting device 100 may be made from a plastic material and may be formed using plastic injection molding, rotational molding, extrusion blow molding, injection blow melding, reaction injection molding, vacuum casting, thermoforming, and compression molding, among other forms of plastic material forming. The use of plastics to form the mounting device 100 results in a relatively less expensive cost in manufacturing and materials. However, the mounting device 100 may be made of any material.

The mounting device 100 serves as the body of the mounting device 100 and includes an internal cavity 204 defined in a bottom side 202 of the mounting device 100. As depicted in, for example, FIGS. 2 through 4, the internal cavity 204 defined in the mounting device 100 forms a recess between the mounting device 100 and a structure to which the mounting device 100 is mounted. The internal cavity 204 and the surface of the structure serve as the boundaries in which a sealant ("S") may be injected. The sealant serves to seal a hole created by a fastener used to couple the mounting device 100 to the structure.

The mounting device 100 further includes a first sealant aperture 102 defined in the mounting device 100 and opening into the internal cavity 204, and a second sealant aperture 104 defined in the mounting device 100 and opening into the internal cavity 204. The first sealant aperture 102 and the second sealant aperture 104 are in fluid communication to one another via the internal cavity 204. Once the mounting device 100 is coupled to the surface of the structure via a fastener, the sealant may be introduced into the internal cavity 204 via any device that may provide pressure sufficient to do so. In one example, the device used to provide pressure to force the sealant into the internal cavity 204 may include any sealant dispensing device such as a caulk gun that uses a plunger to force the sealant from a tube or cartridge into the internal cavity 204. In one example, the first sealant aperture 102 may be shaped and dimensioned to receive a nozzle of the tube or cartridge to facilitate in an easier interface with the mounting device 100 and create a fit between the mounting device 100 and the tube or cartridge such that the sealant does not egress from the first sealant aperture 102 as the sealant is introduced into the internal cavity 204. As the sealant is forced into the internal cavity 204 of the mounting device of the mounting device 100, the sealant fills the internal cavity 204, and once the internal cavity 204 is filled, the sealant may begin to egress out of the internal cavity 204 via the second sealant aperture 104. Once the sealant begins to egress out the second sealant aperture 104, the user may visually inspect that because the sealant is egressing out of the second sealant aperture 104 that they may stop the introduction of the sealant into the internal cavity 204.

In one example, the first sealant aperture 102 may be relatively larger in diameter with respect to the second sealant aperture 104. This allows for the sealant dispensing device to engage with the first sealant aperture 102 and allow for any sealant pushed out the second sealant aperture 104 to be minimal in volume so as to reduce waste of the sealant product. Further, the second sealant aperture 104 being relatively smaller in diameter with respect to the first sealant aperture 102 allows for pressure to build within the internal cavity 204 and allow sealant to fill the internal cavity 204 during dispensing of the sealant before the sealant is expressed out the second sealant aperture 104.

Introduction of the sealant into the internal cavity 204 creates a watertight seal at the point at which the fastener penetrates the surface of the structure. The present systems and methods may be used in connection with any structural attachment. Further, the present systems and methods may be used in connection with any fastener as well as any intermediary devices between the mounting device and an end device such as the photovoltaic panel assemblies described herein. When the sealant is injected under pressure using the caulk gun, the force from the caulk gun increases the pressure inside the internal cavity 204 and forces air out through the second sealant aperture 104. In this manner, the sealant fills the entirety of the internal cavity 204 and removes the air therein. The sealant within the internal cavity 204 creates an airtight and watertight seal around the internal surfaces of the internal cavity 204, any surfaces of the bottom side 202 of the mounting device 100, and any surfaces of the fastener. Although the present systems and methods eliminates the implementation of a flashing layer between the mounting device 100 and the structure resulting in a reduction in costs of materials and installation costs, the present system and devices may also incorporate a flashing layer between the mounting device 100 and the structure.

A fastener aperture 106 may also be defined within the mounting device 100. In one example, the fastener aperture 106 may be defined in a center portion 122 of the mounting device 100. The center portion 122 of the mounting device 100 may include two distended portions; a first distended portion 124 and a second distended portion 126. Further, a lip 108 may be located around the fastener aperture 106 on the first side 110 of the mounting device 100, the first side 110 being located opposite the bottom side 202. In one example, the lip 108 may include a rubber material that allows for a sealed interface between a fastener introduced into eh fastener aperture 106 and the mounting device 100. When the fastener is used to couple the mounting device 100 to a structure, the fastener is extended through the fastener aperture 106 and engages with the surface of the structure. Thus, the mounting device 100 further includes any coupling means to couple the sealing mounting system to the structure. The coupling means may include the fastener and the fastener may include, for example, a screw, a bolt, a nail, a lag screw, or other fastening device that may extend through the fastener aperture 106. The fastener may seat onto the lip 108 such that the when the sealant is introduced into the internal cavity 204, the sealant may abut the fastener at the lip 108 and seal the lip 108.

In one example, a membrane 128 of a flexible material such as a rubber material may be disposed at the first sealant aperture 102 and/or the second sealant aperture 104 to assist a nozzle of the caulk gun to seat into the first sealant aperture 102 and/or control the flow of fluids within the internal cavity 204 including air and sealant. In one example, the membrane 128 may stretch/sit across (either above, under, or aligned with the adjacent surface of) the first sealant aperture 102 and may include a number of perforations 130 to substantially seal the internal cavity 204 of the mounting device 100 while allowing the nozzle of the caulk gun to penetrate the membrane 128. In one example, the perforations 130 of the membrane 128 may return to a closed state or position once the nozzle of the caulk gun is removed so that the membrane 128 serves to seal the first sealant aperture 102 and/or the second sealant aperture 104. Further, a membrane 128 may be included at the second sealant aperture 104 to allow for the sealant to exit the internal cavity 204 of the mounting device 100. In one example, the membrane 128 located at the second sealant aperture 104 may be perforated as described above to allow for the sealant to exit the internal cavity 204 but to return to a closed state or position once pressure from the sealant is removed. In one example, the membrane 128 may be translucent or transparent to allow a user to identify when a sufficient amount of sealant has been forced into the internal cavity 204. In one example, the membrane 128 may be opaque to protect the sealant from any damage due to ultraviolet degradation or other forms of sun exposure degradation. Further, the membrane 128 serves to protect the sealant from degradation that may be caused by exposure to air and/or precipitation.

The mounting device 100 may include an interface portion 112 formed on the mounting device 100. The interface portion 112 secures a bracket to the mounting device 100 at a location of the mounting device 100. More details regarding the interface portion 112 will be described herein in connection with FIGS. 5 through 7 and throughout the examples described herein. The mounting device 100 may further include a first side support 114 coupled to a first end of the interface portion 112 via the center portion 122, and a second side support 116 coupled to a second end of the interface portion 112 via the center portion 122. The first side support 114 and the second side support 116 serve to retain the bracket within the mounting device 100 in a direction perpendicular to the direction the interface portion 112 secures a bracket to the mounting device 100. In this manner, the interface portion 112, the first side support 114, and the second side support 116 secure the bracket to the mounting device 100 in at least two coordinate directions. Further, the interface portion 112, the first side support 114, and the second side support 116 assist in retaining the bracket to and within the mounting device 100 and seat and align the bracket within the mounting device 100 and with the mounting device 100 of the mounting device 100.

The first sealant aperture 102 may be defined in and positioned on a first extension 118 extending from the mounting device 100 and the first side support 114. Similarly, the second sealant aperture 104 may be defined in and positioned on a second extension 120 extending from the mounting device 100 and the second side support 116. Thus, the sealant introduced into the internal cavity 204 may travel from the interior of the first extension 118, through the center portion 122 of the mounting device 100, and toward an interior of the second extension 120 as the sealant is introduced into the first sealant aperture 102 and subsequently expressed from the second sealant aperture 104.

The bottom side 202 of the mounting device 100 may include a barrier channel 206 defined in the bottom side 202. The barrier channel 206 creates a first barrier 208 located in juxtaposition to the internal cavity 204 and a second barrier 210 located past the barrier channel 206 and extending to the outside of the mounting device 100. The barrier channel 206 and the first barrier 208 and second barrier 210 may serve as a double barrier to ensure that the sealant introduced into the internal cavity 204 remains within the internal cavity 204 or within the barrier channel 206.

Figure 5:
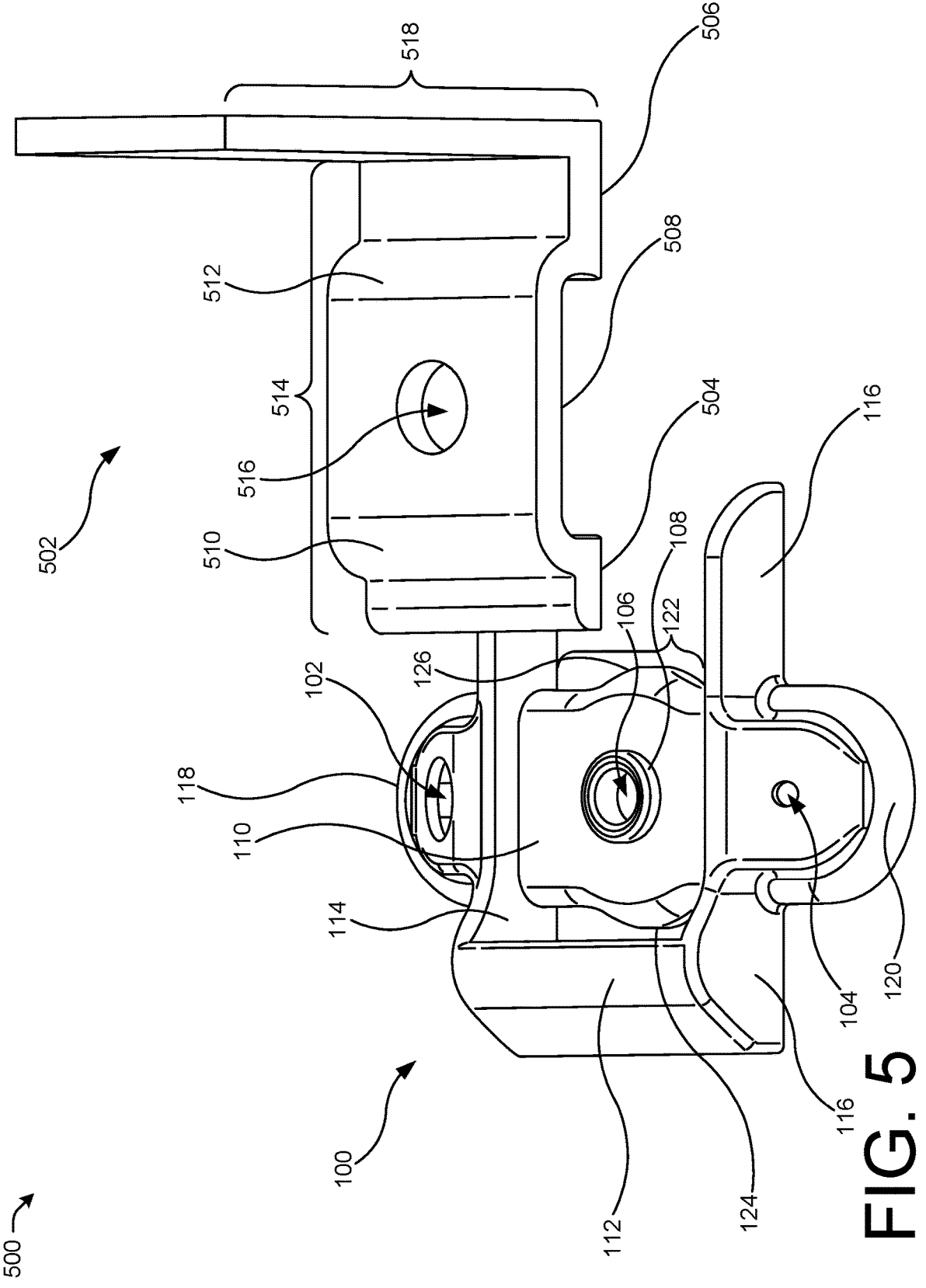
FIG. 5 illustrates a top, perspective view of the mounting device of FIG. 1 with an L-shaped bracket disengaged from the mounting device, according to an example of the principles described herein.
Figure 6:
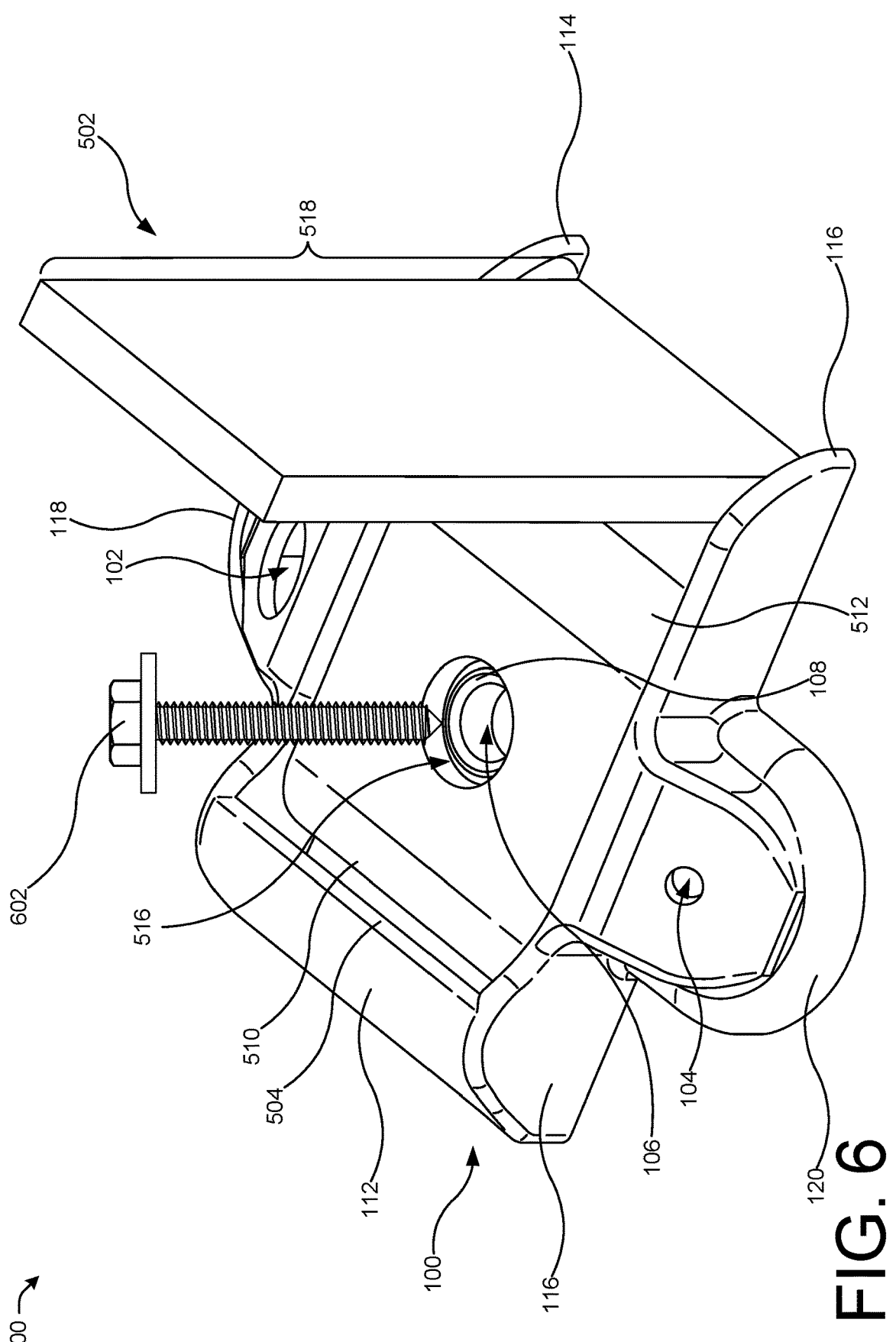
FIG. 6 illustrates a top, perspective view of the mounting device of FIG. 1 with the L-shaped bracket engaged with the mounting device, according to an example of the principles described herein.
Figure 7:
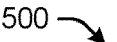
FIG. 7 illustrates a bottom, perspective view of the mounting device of FIG. 1 with the L-shaped bracket engaged with the mounting device, according to an example of the principles described herein.

FIG. 5 illustrates a top, perspective view of the mounting device 100 of FIG. 1 with an L-shaped bracket 502 disengaged from the mounting device 100, according to an example of the principles described herein. Further, FIG. 6 illustrates a top, perspective view of the mounting device 100 of FIG. 1 with the L-shaped bracket 502 engaged from the mounting device 100, according to an example of the principles described herein. Still further, FIG. 7 illustrates a bottom, perspective view of the mounting device 100 of FIG. 1 with the L-shaped bracket 502 engaged from the mounting device 100, according to an example of the principles described herein. The system 500 of FIGS. 5 through 7 provide for a means to couple the L-shaped bracket 502 to a structure via the mounting device 100. Any type of coupling bracket may be used in connection with the examples described herein including the examples of an L-shaped bracket 502 described in connection with FIGS. 5 through 8 and the U-shaped brackets described in connection with FIGS. 9 through 12 and other coupling brackets described herein. The mounting device 100 assists in securing the coupling brackets described herein to a structure.

In one example, a fastener 602 may be extended through the fastener aperture 106 and the bracket aperture 516. The fastener 602 may then penetrate a surface of a structure and engage with the structure to secure the mounting device 100 and the L-shaped bracket 502 to the structure. This process of securing the mounting device 100 and the L-shaped bracket 502 to the structure may be similarly applied to other examples described herein. In the example of FIG. 6, the fastener 602 may include a lag screw. However, any type of fastener may be used. In one example, the fastener 602 may seat inside the bracket aperture 516 and abut the lip 108 of the fastener aperture 106.

The L-shaped bracket 502 includes a first foot portion 504 and a second foot portion 506 that interface with a surface of the structure to which the mounting device 100 is coupled. Further, the L-shaped bracket 502 includes a raised bridge portion 508 that interconnects the first foot portion 504 and the second foot portion 506 that fits over the center portion 122 of the mounting device 100. The raised bridge portion 508 of the L-shaped bracket 502 includes a first ridge 510 located at an interface of the first foot portion 504 and the raised bridge portion 508, and a second ridge 512 located at an interface of the second foot portion 506 and the raised bridge portion 508. The first ridge 510 and the second ridge 512 assist in coupling the mounting device 100 to the L-shaped bracket 502. Specifically, as the mounting device 100 and the L-shaped bracket 502 are coupled together, the first ridge 510 and the second ridge 512 may move past the center portion 122 of the mounting device 100. As mentioned above, the center portion 122 of the mounting device 100 may include two distended portions; a first distended portion 124 and a second distended portion 126. These distended portions 124, 126 are at least partially rounded such that as the first ridge 510 and the second ridge 512 may move past the distended portions 124, 126, respectively, during coupling of the L-shaped bracket 502 to the mounting device 100, the first ridge 510 and the second ridge 512 of the L-shaped bracket 502 retain the center portion 122 within the raised bridge portion 508 of the L-shaped bracket 502 and cause the mounting device 100 and the L-shaped bracket 502 to be mechanically engaged via an engineering fit in this manner.

A bottom portion 514 (i.e., bracket base) of the L-shaped bracket 502 engages with the mounting device 100 via the engineering fit between the first ridge 510 and second ridge 512 of the raised bridge portion 508 of the L-shaped bracket 502 and the distended portions 124, 126 of the center portion 122 of the mounting device 100. These elements of the mounting device 100 and the L-shaped bracket 502 serve to retain the bottom portion 514 of the L-shaped bracket 502 and seat and align the bottom portion 514 of the L-shaped bracket 502 within the mounting device 100 and with the mounting device 100 of the mounting device 100.

The coupling means (e.g., a lag screw) used to couple the mounting device 100 to the structure may extend through a bracket aperture 516 to secure the L-shaped bracket 502 to the mounting device 100 of the mounting device 100. As mentioned above, the mounting device 100 includes a fastener aperture 106 defined in the mounting device 100 through which the coupling means is extended to secure the mounting device 100 to the structure. Further, the L-shaped bracket 502 includes the bracket aperture 516 defined in the L-shaped bracket 502. Thus, the fastener aperture 106 and the bracket aperture 516 receive the coupling means for coupling the mounting device 100 and the L-shaped bracket 502 to the structure. In one example, the fastener aperture 106 defined in the mounting device 100 may include the lip 108 that engages with an interior surface of the bracket aperture 516 defined in the L-shaped bracket 502. This allows the L-shaped bracket 502 to seat onto the mounting device 100 and align the fastener aperture 106 defined in the mounting device 100 with the bracket aperture 516 defined in the L-shaped bracket 502. Although only one aperture is depicted in the L-shaped bracket 502 and mounting device 100 in the examples described herein, any number of apertures may be defined in the mounting device 100 and/or L-shaped bracket 502 to allow for a corresponding number of coupling means or fasteners to be used to secure the mounting device 100 to the structure.

With reference to FIGS. 6 and 7, the L-shaped bracket 502 may couple to the mounting device 100 and seat within the first side support 114, second side support 116, and interface portion 112 as depicted therein. The first foot portion 504 of the L-shaped bracket 502 may enter and seat within the interface portion 112 and be retained within the interface portion 112 such that the first foot portion 504 does not move in at least three coordinate directions including an x-, y-, and z-direction since the interface portion 112 surrounds the first foot portion 504 of the L-shaped bracket 502 in three coordinate directions. Further, as mentioned above, the raised bridge portion 508 of the L-shaped bracket 502 engages with the center portion 122 of the mounting device 100 and is dimensioned to create an engineering fit between the first ridge 510 and second ridge 512 of the L-shaped bracket 502 and the first distended portion 124 and a second distended portion 126, respectively. Further, the bottom portion 514 of the L-shaped bracket 502 engages with the first side support 114 and the second side support 116 such that their respective dimensions create a similar engineering fit therebetween. As used in the present specification and in the appended claims, the term "engineering fit" is meant to be understood broadly as any engineering fit such as, for example, a clearance fit (e.g., one of a loose running fit, a free running fit, a close running fit, a sliding fit, and a location fit), a transition fit (e.g., one of a similar fit, and a fixed fit), and an interference fit (e.g., one of a press fit, a driving fit, and a forced fit).

Further, as the L-shaped bracket 502 is coupled to the mounting device 100, an exterior surface of the lip 108 may form an engineering fit with the interior surface of the bracket aperture 516 defined in the L-shaped bracket 502. As mentioned herein, the engineering fit between the interior surface of the bracket aperture 516 and the exterior surface of the lip 108 allows the L-shaped bracket 502 to seat onto the mounting device 100 and align the fastener aperture 106 defined in the mounting device 100 with the bracket aperture 516 defined in the L-shaped bracket 502. Further, the engineering fit between the interior surface of the bracket aperture 516 and the exterior surface of the lip 108 provides for additional restrictions to the movement of the L-shaped bracket 502 with respect to the mounting device 100 including in at least two coordinate directions.

The L-shaped bracket 502 may also include a vertical portion 518 (i.e., device coupling support) that extends transversely from the bottom portion 514. The vertical portion 518 may include any shape and features to provide for the coupling of additional devices or elements to the L-shaped bracket 502 as is described herein with regard to additional embodiments and examples. In this manner, the mounting device 100 is used to couple the L-shaped bracket 502 or other devices or elements to the structure.

Figure 8:
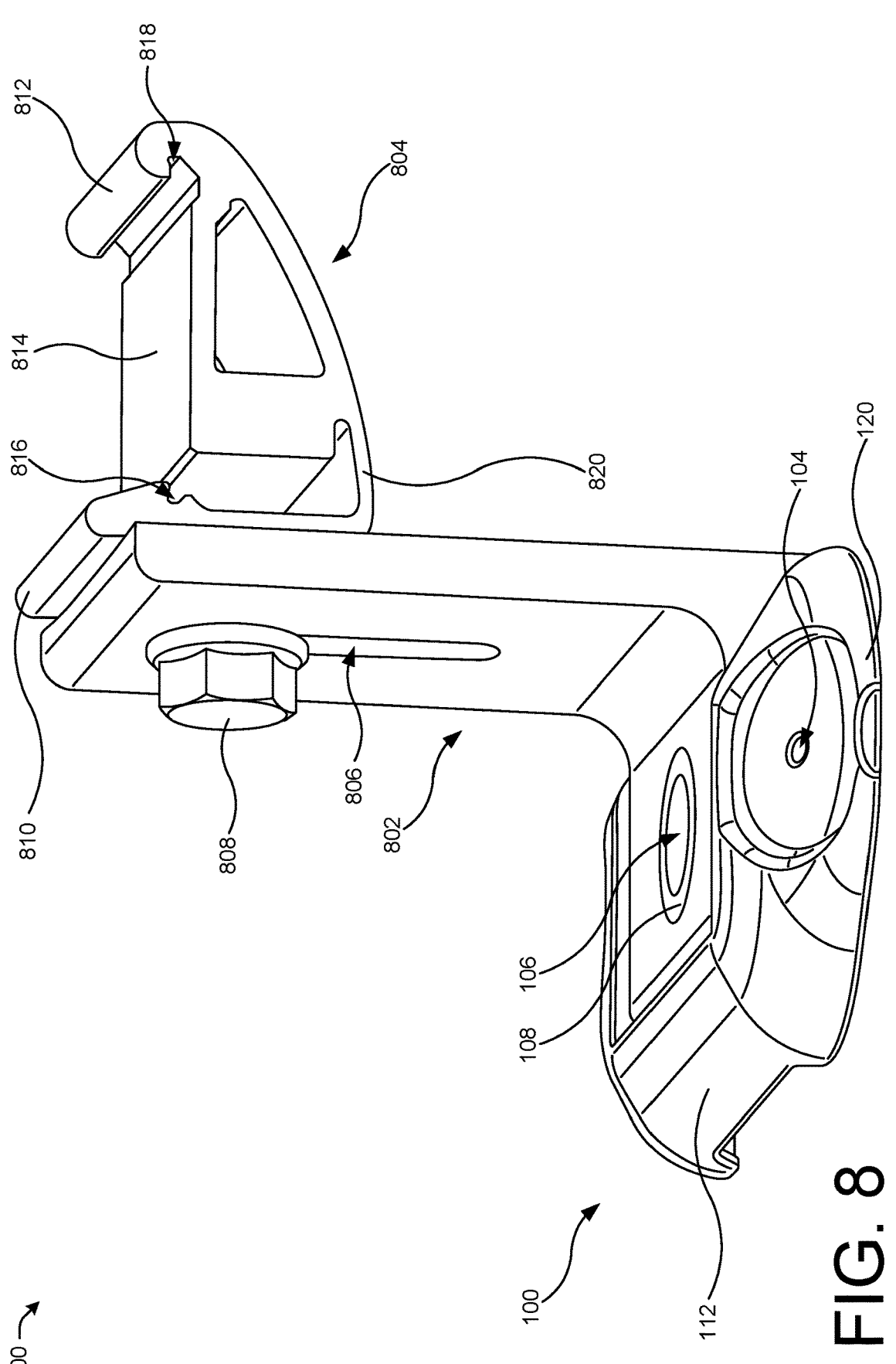
FIG. 8 illustrates a perspective view of the mounting device of FIG. 1 with the L-shaped bracket engaged with the mounting device and a clamp mounted to the L-shaped bracket, according to an example of the principles described herein.

Thus, the above description applies to other examples of mounting devices including different examples of L-shaped brackets and any attached intermediate devices. As on example, FIG. 8 illustrates a perspective view of the mounting device 800 similar to the mounting device 100 of FIG. 1 with an L-shaped bracket 802 engaged with the mounting device 100 and a clamp 804 mounted to the L-shaped bracket 802, according to an example of the principles described herein. In this example, the L-shaped bracket 802 may include features described herein in connection with the L-shaped bracket 502 of FIG. 5, including elements that assist in coupling the L-shaped bracket 502/802 to the mounting device 100 of the mounting device 100. Further, the L-shaped bracket 802 of FIG. 8 includes a slit 806 defined therein to accommodate a bracket fastener 808 and other devices that may be coupled to the L-shaped bracket 802 via the bracket fastener 808. In the example of FIG. 8, the bracket fastener 808 may include a bolt, washer, and nut that couples the clamp 804 to the L-shaped bracket 802. In the example of FIG. 8, the clamp 804 is depicted as attached to the L-shaped bracket 802 via the bracket fastener 808 extended through the slit 806. The clamp 804 may be used to secure any structure-mounted object such as a rail or a photovoltaic panel assembly to the mounting device 100. In this example, the rail or photovoltaic panel assembly may be coupled to the mounting device 100 via the clamp 804, the L-shaped bracket 802, and the mounting device 100 of the mounting device 100. Due to the slit 806 defined in the L-shaped bracket 802, the clamp 804 may be adjustably coupled along a height of the L-shaped bracket 802.

Further, as depicted in FIG. 8, the clamp 804 may include a fixed jaw 810, a movable jaw 812, and a clamp body 814 coupling the fixed jaw 810 and the movable jaw 812 via a spring-biased hinge 820. The fixed jaw 810 may include a first indentation 816 and the movable jaw 812 may include a second indentation 818. The first indentation 816 and the second indentation 818 may be dimensioned such that correspondingly dimensioned portions of an element such as a rail or a photovoltaic panel assembly may extend and seat into the first indentation 816 and the second indentation 818, respectively. The spring-biased hinge 820 may cause the fixed jaw 810 and the movable jaw 812 to bias toward one another in order to clamp the rail or photovoltaic panel assembly between the fixed jaw 810 and the movable jaw 812. Once seated and clamped in the clamp 804, the rail or photovoltaic panel assembly may be retained within the clamp 804 due to the seating of the rail or photovoltaic panel assembly within the first indentation 816 and the second indentation 818 and by the spring bias provided by the spring-biased hinge 820. In this manner, the mounting device 100 of the mounting device 100 and the L-shaped bracket 802 assist in coupling various elements to a structure.

Figure 9:
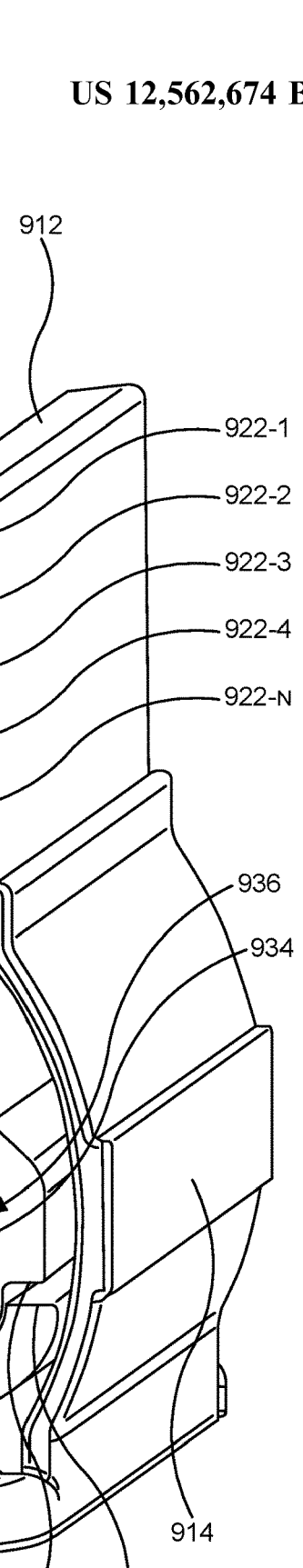
FIG. 9 illustrates a top, perspective view of a mounting device including a spring-biased portion formed on the mounting device, according to an example of the principles described herein.
Figure 10:
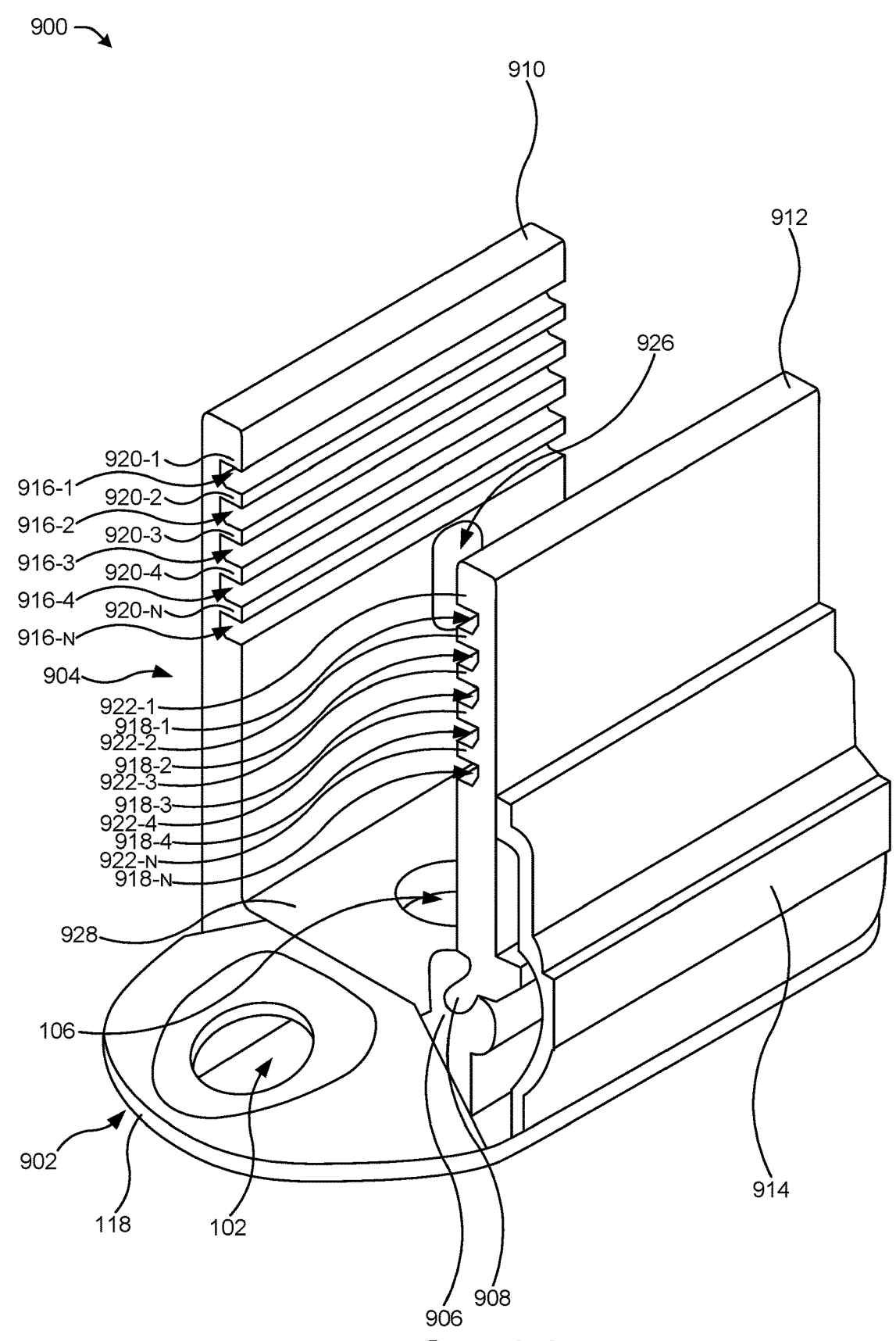
FIG. 10 illustrates a top, perspective view of the mounting device of FIG. 9, according to an example of the principles described herein.

FIG. 9 illustrates a top, perspective view of a mounting device 900 including a spring-biased portion 914 formed on the mounting device 902, according to an example of the principles described herein. Further, FIG. 10 illustrates examples of the double stanchion coupling devices of FIG. 9, according to an example of the principles described herein. In this example, the U-shaped bracket 904 may include a "goal post" form factor.

In the example of FIGS. 9 and 10, a U-shaped bracket 904 may include features described herein in connection with the L-shaped brackets 502 and 802 of FIGS. 5 and 8 including elements that assist in the coupling the U-shaped bracket 904 to the mounting device 900. The mounting device 900 may also include features described herein in connection with the mounting device 100 of FIGS. 5 and 8 including elements that assist in the coupling of the U-shaped bracket 904 to the mounting device 902 of the mounting device 900. Further, the mounting device 902 of FIGS. 9 and 10 may include a spring-biased portion 914 coupled to or mono-lithically formed with the mounting device 902. The spring-biased portion 914 may be formed from the mounting device 902 as, for example, a portion of the mounting device 902 that extends from the mounting device 902. In one example, the spring-biased portion 914 May be biased toward a fixed stanchion 910 so that when the spring-biased portion 914 contacts a movable stanchion 912, the spring-biased portion 914 forces the movable stanchion 912 toward the fixed stanchion 910.

The U-shaped bracket 904 of FIGS. 9 and 10 may include a fixed stanchion 910 and a movable stanchion 912 opposite the fixed stanchion 910. The fixed stanchion 910 may be coupled to or monolithically formed with a bottom portion 928 of the U-shaped bracket 904. Further, a barrel 906 of a barrel hinge may be coupled to or monolithically formed with the bottom portion 928 of the U-shaped bracket 904. The U-shaped bracket 904 may also include a pin 908 coupled to or monolithically formed with the movable stanchion 912. The pin 908 is dimensioned to engage with the barrel 906 via an engineering fit that allows for the pin 908 to rotate within the barrel 906. In this manner, the barrel 906 and the pin 908 for the barrel hinge that mechanically couples the movable stanchion 912 to the bottom portion 928 of the U-shaped bracket 904. Further, in this manner, the movable stanchion 912 is coupled to the bottom portion 928 opposite the fixed stanchion 910 and rotatably coupled to the bottom portion 928. Still further, in one example, any type of mechanical bearing may be used as the barrel hinge of the example of FIGS. 9 and 10.

In one example, the movable stanchion 912 may include a stop 930 formed adjacent to the pin 908 on the movable stanchion 912. The stop 930 serves to restrict the radial degree to which the pin 908 may rotate within the barrel 906 and, consequently, the degree at which the movable stanchion 912 may move relative to the fixed stanchion 910. The stop 930 may be restricted by a first end 932 of the barrel 906 when fully rotated in a first direction. Thus, when the stop 930 comes into contact with the first end 932 of the barrel 906, the rotation of the pin 908 is restricted.

The spring-biased portion 914 is biased to force the movable stanchion 912 toward the fixed stanchion 910. The barrel 906 may include a second end 934. Further, the movable stanchion 912 may include a recess 936 in which the second end 934 may abut and seat within when the spring-biased portion 914 forces the movable stanchion 912 toward the fixed stanchion 910. In this manner, the second end 934 of the barrel 906 may cause the movable stanchion

912 to stop its rotational movement with respect to the fixed stanchion 910 based on a termination of the barrel 906.

The fixed stanchion 910 may include a number of first recesses 916-1, 916-2, 916-3, 916-4 . . . 916-N where N is any integer greater than or equal to 1 (collectively referred to herein as first recess(es) 916 unless specifically addressed otherwise) defined in the fixed stanchion 910. The first recesses 916 create a number of first threads 920-1, 920-2, 920-3, 920-4, 920-N where N is any integer greater than or equal to 1 (collectively referred to herein as first thread(s) 920 unless specifically addressed otherwise). Similarly, the movable stanchion 912 may include a number of second recesses 918-1, 918-2, 918-3, 918-4 . . . 918-N where N is any integer greater than or equal to 1 (collectively referred to herein as second recess(es) 918 unless specifically addressed otherwise) defined in the fixed stanchion 910. The second recesses 918 create a number of second threads 922-1, 922-2, 922-3, 922-4, 922-N where N is any integer greater than or equal to 1 (collectively referred to herein as second thread(s) 922 unless specifically addressed otherwise). The first threads 920 and the second threads 922 may be dimensioned such that correspondingly dimensioned portions of an element such as a rail or a photovoltaic panel assembly may extend and seat into the first threads 920 and the second threads 922, respectively. The spring-biased portion 914 may cause the fixed stanchion 910 and the movable stanchion 912 to bias toward one another in order to clamp the rail or the photovoltaic panel assembly between the fixed stanchion 910 and the movable stanchion 912 at a desired height along the height of the first threads 920 and the second threads 922. In one example, the first threads 920 and the second threads 922 may elevationally match up with one another such that, for example, first thread 920-1 is located at a same elevation as second thread 922-1, first thread 920-2 is located at a same elevation as second thread 922-2, first thread 920-3 is located at a same elevation as second thread 922-3, etc. This allows the rail or the photovoltaic panel assembly or other device to be horizontally leveled with respect to a surface of the structure.

The fixed stanchion 910 may include a tightening aperture 926 defined therein through which a tightening bolt 924 may extend. The tightening bolt 924 may extend thought the tightening aperture 926 and engage with a threaded portion (not shown) in the movable stanchion 912. This allows for the tightening of the fixed stanchion 910 and the movable stanchion 912 around an object that is coupled to the U-shaped bracket 904 such as, for example, a rail or a photovoltaic panel assembly.

Once seated and clamped between the fixed stanchion 910 and the movable stanchion 912 of the U-shaped bracket 904, the rail or the photovoltaic panel assembly may be retained within the U-shaped bracket 904 due to the seating of the rail or the photovoltaic panel assembly within the first thread 920 and the second thread 922 and by the spring bias provided by the spring-biased portion 914. Further, engagement of the tightening bolt 924 causes the fixed stanchion 910 and the movable stanchion 912 to retain the rail or the photovoltaic panel assembly within the U-shaped bracket 904 and tighten the fixed stanchion 910 and the movable stanchion 912 against the rail or the photovoltaic panel assembly. In this manner, the mounting device 100 including the mounting device 902 and the U-shaped bracket 904 assist in coupling various elements to a structure.

In practice, when the tightening bolt 924 is loosened, the tightening bolt 924 allows the movable stanchion 912 to rotate about the hinge point created by the pin 908 and barrel 906 of the barrel hinge and away from the fixed stanchion 910, while the spring-biased portion 914 biases the movable stanchion 912 towards the fixed stanchion 910. In this manner, an object such as a rail or photovoltaic cell assembly may be placed between the fixed stanchion 910 and the movable stanchion 912 as depicted in FIGS. 9 and 10. As the object is forced therebetween, the spring force provided by the spring-biased portion 914 is overcome and the object may be seated between the fixed stanchion 910 and the movable stanchion 912. The first recesses 916 and the second recesses 918 of the fixed stanchion 910 and the movable stanchion 912, respectively, may engage with a protruding portion of the object to allow the object to seat between the fixed stanchion 910 and the movable stanchion 912 at a number of heights. The tightening bolt 924 or other fastener may be tightened to retain the object between the fixed stanchion 910 and the movable stanchion 912.

Figure 11:
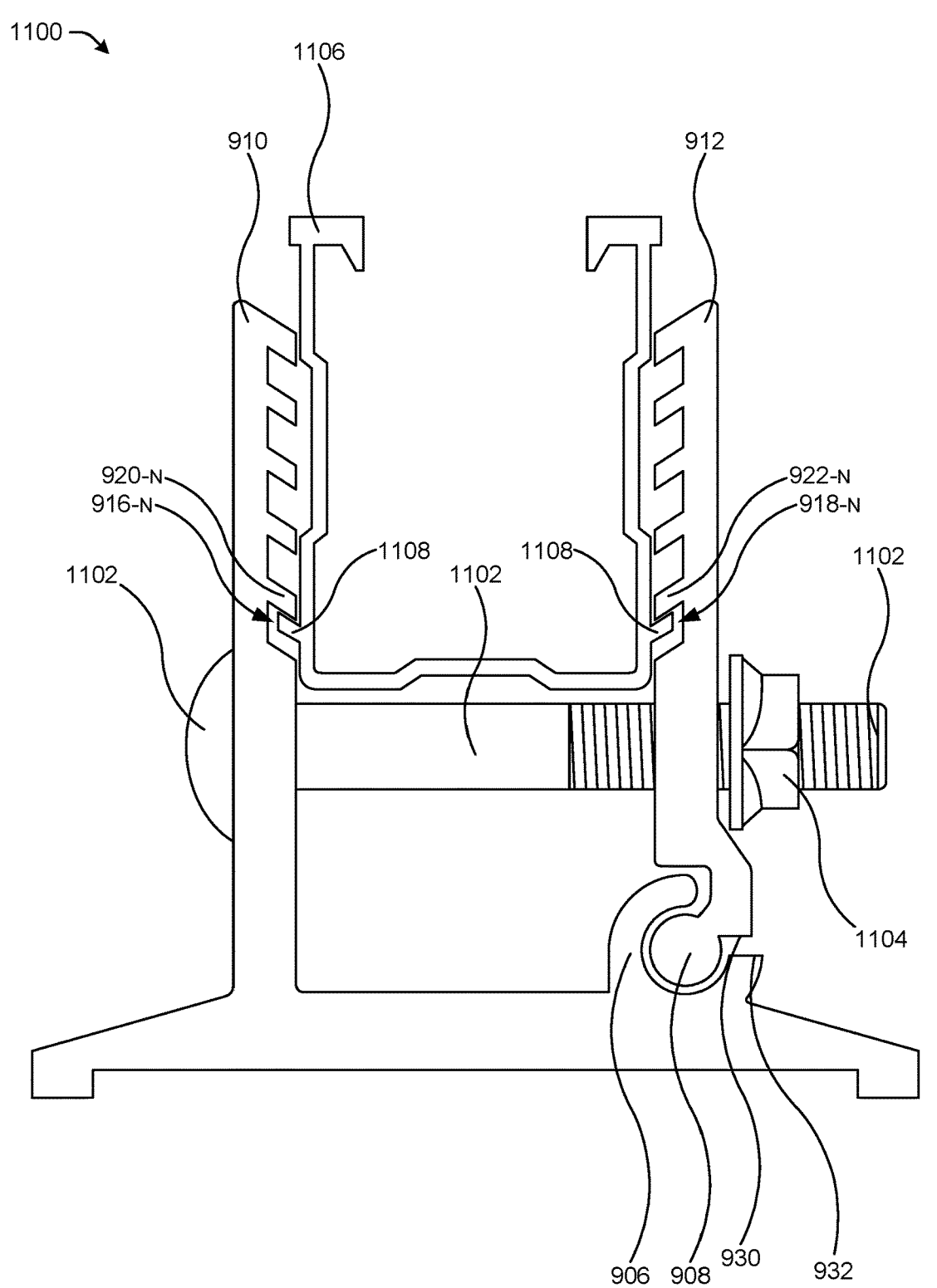
FIG. 11 illustrates an example of the U-shaped bracket similar to the U-shaped bracket of FIG. 9, according to an example of the principles described herein.
Figure 12:
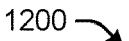
FIG. 12 illustrates an example of the U-shaped bracket similar to the U-shaped bracket of FIG. 9, according to an example of the principles described herein.

Further, as depicted in FIGS. 9 and 10, a rail or other device may include a number of protrusions such as those described herein in connection with FIGS. 11 and 12 that are angled to match an angled interior shape of the first recesses 916 and the second recesses 918. When the rail or other device is brought into mechanical coupling with the fixed stanchion 910 and the movable stanchion 912 of the U-shaped bracket 904, the protrusions may overcome any force placed on the movable stanchion 912 by the spring-biased portion 914. In this manner, the protrusions of the rail or other device are able to slide past a number of the first recesses 916 and the second recesses 918 until a desired height of the rail or other device within the U-shaped bracket 904 is achieved. At this point, the tightening bolt 924 may be tightened such that the movement of the rail or other device is prevented and the protrusions of the rail or other device are no longer able to slide past the first recesses 916 and the second recesses 918. In this manner, the rail or other device is secured within the U-shaped bracket 904 through use of the spring-biased portion 914 and the tightening bolt 924.

FIG. 11 illustrates an example of the U-shaped bracket 1100 similar to the U-shaped bracket 904 of FIG. 9, according to an example of the principles described herein. The U-shaped bracket 1100 of FIG. 11 may include any of the mounting devices 100, 902, depicted above in connection with FIGS. 1 through 10 or described elsewhere herein, but is not shown in order to provide clarity to the description.

The example of FIG. 11 does not include the spring-biased portion 914, but instead includes a bolt 1102 and a nut 1104 to reduce the distance between the fixed stanchion 910 and the movable stanchion 912, thereby creating tension and retaining the clamped position on attached device (e.g., a rail, for example). Further, in FIG. 11, a rail 1106 is clamped between the fixed stanchion 910 and the movable stanchion 912. In this example, the rail 1106 includes a number of oppositely located protrusions 1108 at the outer sides of the rail 1106 that may seat within first recess 916-N and second recess 918-N, respectively. Although only one set of protrusions 1108 are depicted as being included with the outer sides of the rail 1106, in one example, any number of protrusions 1108 or sets of protrusions 1108 may be included on the rail 1106. In this example, the sets of protrusions 1108 may be distanced along a height of the rail 1106 to match the locations of the first recess 916-N and second recess 918-N. Further, although, the protrusions 1108 of the rail 1106 are depicted as being engaged within first recess 916-N and second recess 918-N, the protrusions 1108 may be engaged with any first recess 916 and correspondingly located second recess 918. In this manner, the rail 1106 may be raised or lowered depending on which pair of the first recess 916 and second recess 918 the protrusions 1108 of the rail 1106 are seat in.

Further, as depicted in FIG. 11, the protrusions 1108 of the rail 1106 are angled to match an angled interior shape of the first recesses 916 and the second recesses 918 such that when the rail 1106 is brought into mechanical coupling with the fixed stanchion 910 and the movable stanchion 912 of the U-shaped bracket 1100, the protrusions 1108 may overcome any force placed on the movable stanchion 912 by the bolt 1102 and a nut 1104 as the bolt 1102 and a nut 1104 are not yet completely tightened. In this manner, the protrusions 1108 of the rail 1106 are able to slide past a number of the first recesses 916 and the second recesses 918 until a desired height of the rail 1106 within the U-shaped bracket 1100 is achieved. At this point, the bolt 1102 and a nut 1104 may be tightened such that the movement of the rail 1106 is prevented and the protrusions 1108 of the rail 1106 are no longer able to slide past the first recesses 916 and the second recesses 918. In this manner, the rail 1106 is secured within the U-shaped bracket 1100.

FIG. 12 illustrates an example of the U-shaped bracket 1200 similar to the U-shaped bracket 904 of FIG. 9, according to an example of the principles described herein. The U-shaped bracket 1100 of FIG. 11 may include any of the mounting devices 100, 902, depicted above in connection with FIGS. 1 through 10 or described elsewhere herein, but is not shown in order to provide clarity to the description.

The example of FIG. 12 includes similar features of the examples of FIGS. 9 through 11 and description of those features is provided herein. The example of FIG. 12 includes a movable stanchion 912 that is able to move with respect to the fixed stanchion 910 via a relatively thinner portion of material forming a "thin leg" 1202 that allows for the second stanchion to move relative to the first stanchion in a spring-like manner. The thin leg 1202 may be subjected to elastic deformation wherein the movable stanchion 912 may be moved with respect to the fixed stanchion 910 but return to its original state and position. As used in the present specification and in the appended claims, the term "clastic deformation" is meant to be understood broadly as any temporary change in length, volume, or shape produced in an elastic substance by a stress that is less than the elastic limit of the substance. In this manner, the thin leg 1202 serves as a spring much like the spring-biased portion 914 of FIGS. 9 and 10.

As similarly described above in connection with FIGS. 9 through 11, as depicted in FIG. 12, the protrusions 1108 of the rail 1106 are angled to match an angled interior shape of the first recesses 916 and the second recesses 918 such that when the rail 1106 is brought into mechanical coupling with the fixed stanchion 910 and the movable stanchion 912 of the U-shaped bracket 1200, the protrusions 1108 may overcome any force placed on the movable stanchion 912 by the bolt 1102 and a nut 1104 as the bolt 1102 and a nut 1104 are not yet completely tightened. In this manner, the protrusions 1108 of the rail 1106 are able to slide past a number of the first recesses 916 and the second recesses 918 until a desired height of the rail 1106 within the U-shaped bracket 1200 is achieved. At this point, the bolt 1102 and a nut 1104 may be tightened such that the movement of the rail 1106 is prevented and the protrusions 1108 of the rail 1106 are no longer able to slide past the first recesses 916 and the second recesses 918. In this manner, the rail 1106 is secured within the U-shaped bracket 1200.

Figure 13:
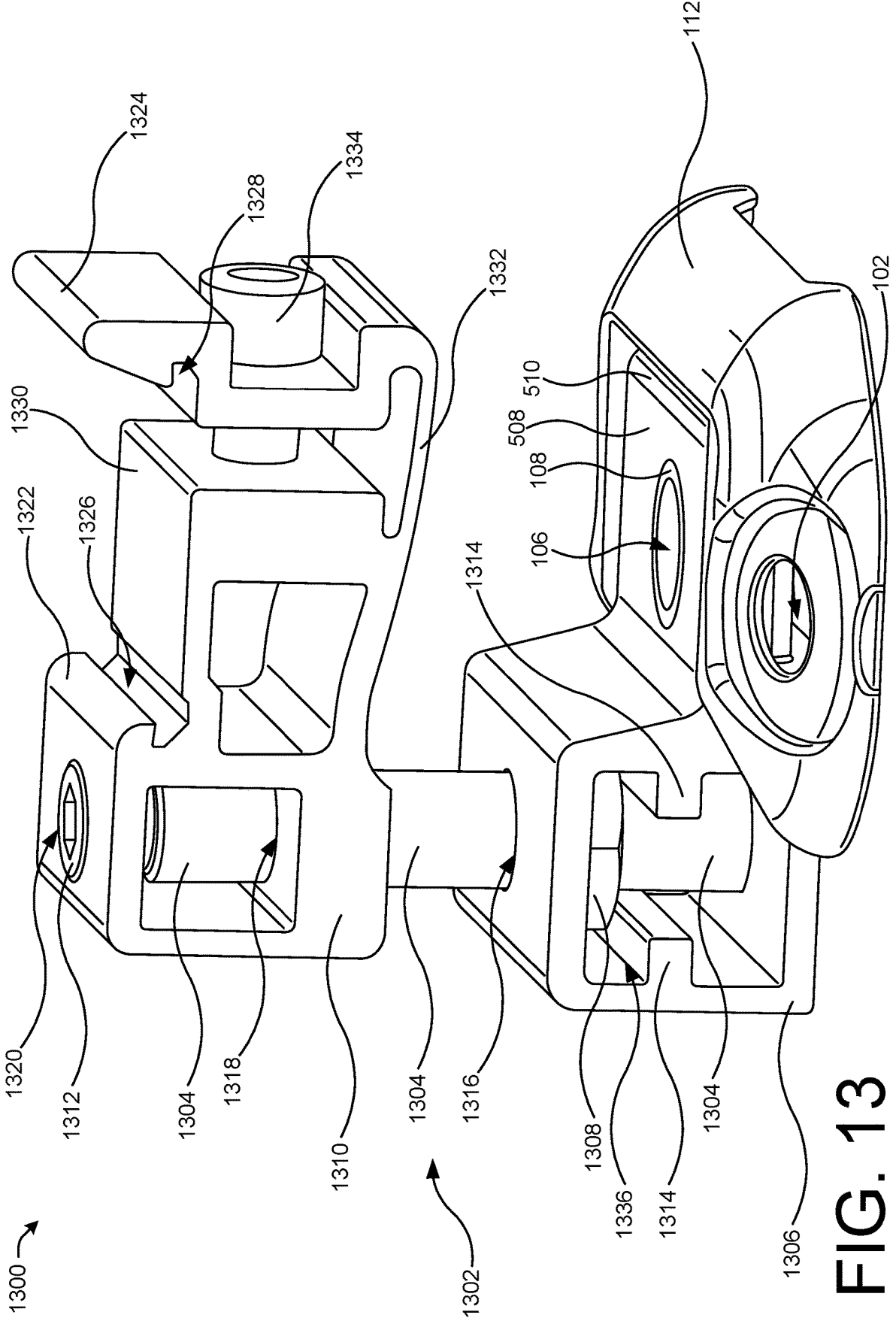
FIG. 13 illustrates a perspective view of the mounting device of FIG. 1 with a height-adjustable bracket engaged with the mounting device and a clamp mounted to the height-adjustable bracket, according to an example of the principles described herein.

FIG. 13 illustrates a perspective view of the mounting device of FIG. 1 with a height-adjustable bracket 1302 engaged with the mounting device 100 and a clamp 1310 mounted to the height-adjustable bracket 1302, according to an example of the principles described herein. The height-adjustable bracket 1302 may be included within an overall height-adjustable mounting device 1300. The height-adjustable bracket 1302 may include elements of, for example, the L-shaped bracket 502 of FIGS. 5 through 7, and may further include a base portion 1306, a cylindrical stanchion 1304 couped to the base portion 1306 via an adjustment nut 1308, the clamp 1310 coupled to the cylindrical stanchion 1304, and a height adjustment screw rotatably coupled to the cylindrical stanchion 1304 and the clamp 1310.

The base portion 1306 may be coupled to or monolithically formed with the raised bridge portion 508 as described herein in connection with FIGS. 5 through 7. The base portion 1306 may include a first aperture 1316 through which the cylindrical stanchion 1304 may extend. Further, a number of retention ledges 1314 may be formed within the interior of the base portion 1306. The formation of the retention ledges 1314 within the interior of the base portion 1306 creates a retention housing 1336. The retention ledges 1314 may secure the adjustment nut 1308 while still allowing the adjustment nut 1308 to rotate along the cylindrical stanchion 1304. In one example, the cylindrical stanchion 1304 may include a number of threads (not shown) about which the adjustment nut 1308 may turn to adjust the height of the cylindrical stanchion 1304 relative to the base portion 1306. In this manner, the turning of the adjustment nut 1308 about the cylindrical stanchion 1304 results in the height of the clamp 1310 relative to the base portion 1306 being shifted up or down depending on the direction of the turning of the adjustment nut 1308. In one example, the turning of the adjustment nut 1308 may provide for coarse adjustments to the height of the clamp 1310 relative to the base portion 1306.

The cylindrical stanchion 1304 may extend through a second aperture 1318 defined in the clamp 1310. Further, an adjustment screw 1312 may extend through a third aperture 1320 defined in the clamp 1310. The adjustment screw 1312 may be coupled to an end of the cylindrical stanchion 1304 via, for example, a number of threads (not shown for purposes of clarity in the figure, nevertheless, one skilled in the art would recognize the ability to have threads on the body of the adjustment screw 1312) defined on the adjustment screw 1312 and a corresponding number of threads (not shown) defined on an interior of the cylindrical stanchion 1304. Further, the and the adjustment screw 1312 may be rotatably coupled to the clamp 1310 such that when the adjustment screw 1312 is turned the adjustment screw 1312 is maintained at the same position within the clamp 1310. When rotated within the clamp 1310, the adjustment screw 1312 may cause the clamp 1310 to move up or down relative to the cylindrical stanchion 1304. In this manner, the turning of the adjustment screw 1312 relative to the cylindrical stanchion 1304 results in the height of the clamp 1310 relative to the base portion 1306 being shifted up or down depending on the direction of the turning of the adjustment screw 1312. In one example, the turning of the adjustment screw 1312 may provide for fine adjustments to the height of the clamp 1310 relative to the base portion 1306. Thus, through the turning of the adjustment nut 1308 may provide for coarse adjustments that cause a relatively more significant adjustment of the height of the clamp 1310 relative to the base portion 1306 as compared to the relatively finer adjustments to the height of the clamp 1310 relative to the base portion 1306 provided by the turning of the adjustment screw 1312. The ability to adjust the height of the clamp

1310 relative to the base portion 1306 allows for the leveling of devices attached to the clamp 1310 relative to a surface of the structure and/or relative to other height-adjustable mounting devices 1300 used to couple the devices to the structure.

The clamp 1310 may include a fixed jaw 1322, a movable jaw 1324, and a clamp body 1330 coupling the fixed jaw 1322 and the movable jaw 1324 via a spring-biased hinge 1332. The fixed jaw 1322 may include a first indentation 1326 and the movable jaw 1324 may include a second indentation 1328. The first indentation 1326 and the second indentation 1328 may be dimensioned such that correspondingly dimensioned portions of an element such as a rail or a photovoltaic panel assembly may extend and seat into the first indentation 1326 and the second indentation 1328, respectively. The spring-biased hinge 1332 may cause the fixed jaw 1322 and the movable jaw 1324 to bias toward one another in order to clamp the rail or photovoltaic panel assembly between the fixed jaw 1322 and the movable jaw 1324. Once seated and clamped in the clamp 1310, the rail or photovoltaic panel assembly may be retained within the clamp 1310 due to the seating of the rail or photovoltaic panel assembly within the first indentation 1326 and the second indentation 1328 and by the spring bias provided by the spring-biased hinge 1332. Further, in the example of FIG. 13, a tightening bolt 1334 may extend through a portion of the movable jaw 1324 and into a portion of the fixed jaw 1322. When coupling the rail or photovoltaic panel assembly to the clamp 1310, the tightening bolt 1334 may be left loose to allow for the spring-biased hinge 1332 to capture the rail or photovoltaic panel assembly. Thereafter, once the rail or photovoltaic panel assembly are seated in the first indentation 1326 and the second indentation 1328, the tightening bolt 1334 may be engaged to cause the tighten the movable jaw 1324 to move toward the fixed jaw 1322 and tighten against the rail or the photovoltaic panel assembly. In this manner, the mounting device 100 of the height-adjustable mounting device 1300 and the height-adjustable bracket 1302 assist in coupling various elements to a structure.

Figure 14:
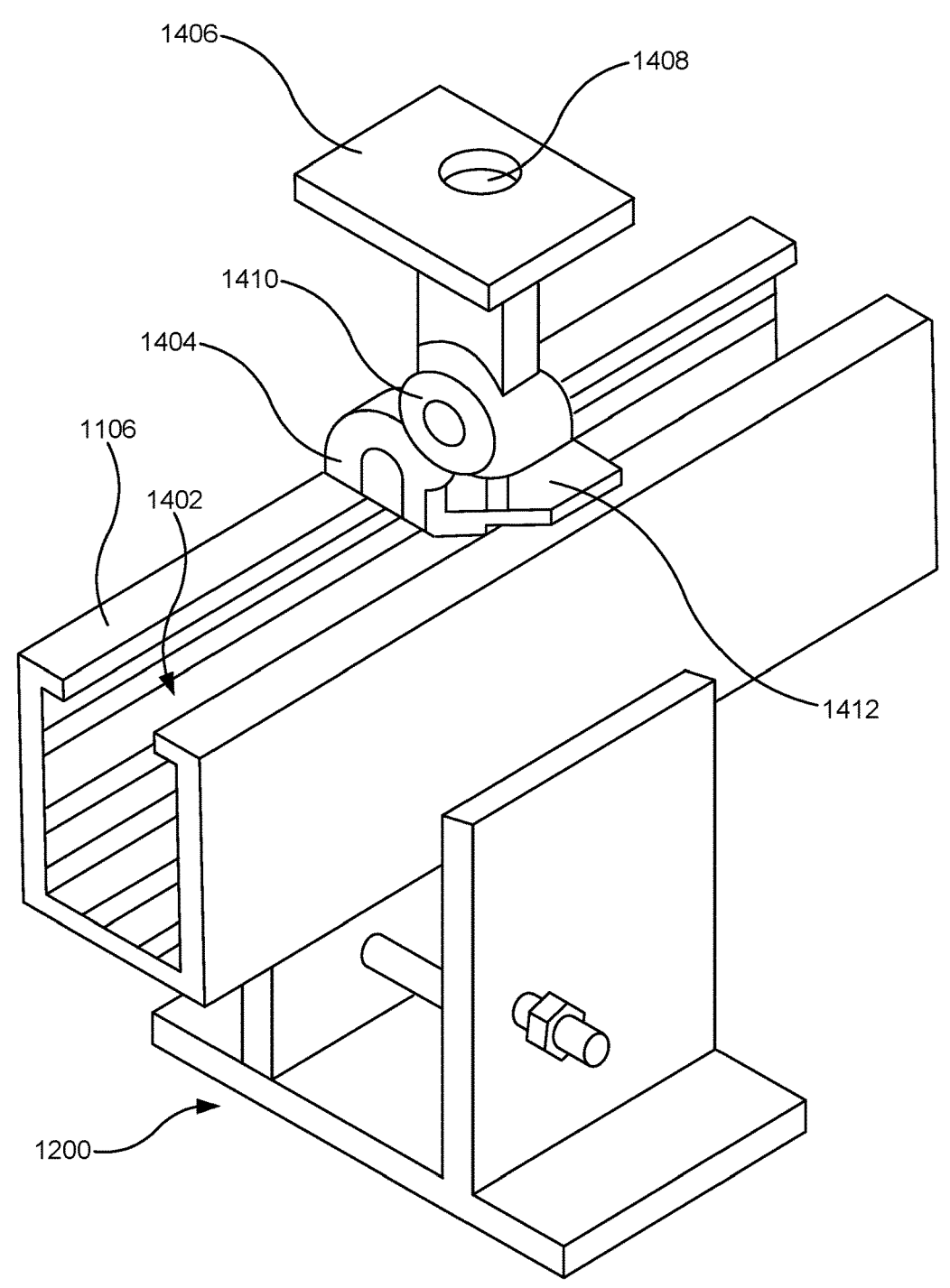
FIG. 14 illustrates an example of a mounting device, according to an example of the principles described herein.

FIG. 14 illustrates an example of a mounting system 1400, according to an example of the principles described herein. The mounting system 1400 of FIG. 14 may include any of the mounting devices 100, 902, depicted above in connection with FIGS. 1 through 13.

The mounting system 1400 may include a U-shaped bracket that may, for example, include any of the U-shaped brackets 904, 1100, 1200 of FIGS. 9 through 12, respectively. The U-shaped bracket 1200 of FIG. 12 will be described in connection with FIG. 14 as being the U-shaped bracket of the mounting system 1400. The mounting system 1400 may secure a rail 1106 such as the rail 1106 depicted in FIGS. 11 and 12. The rail 1106 may include a channel 1402 defined in a top surface to allow for an articulating mount 1404.

The articulating mount 1404 may include a foot 1406 that may be used to couple other devices such as a photovoltaic panel assembly. The devices such as the photovoltaic panel assembly may be coupled to the foot 1406 via a fastening recess 1408. In one example, the fastening recess 1408 may include threads to allow a bolt or screw associated with the photovoltaic panel assembly, for example, to secure the photovoltaic panel assembly to the foot 1406.

Further, the articulating mount 1404 may allow the foot 1406 to articulate with respect to the rail 1106 and/or the structure to which the mounting system 1400. The articulating mount 1404 may include a joint 1410 to provide the articulation of the articulating mount 1404. In one example, the joint 1410 may include a pivot joint, a hinge joint, a ball and socket joint, a pin joint, a revolute joint, or other type of mechanical joints.

In one example, the articulating mount 1404 may also include a cam lever 1412. The cam lever 1412, when mechanically activated, may release the articulating mount 1404 from the rail 1106 and allow for the articulating mount 1404 to be removed and/or slide along the length of the articulating mount 1404 along the channel 1402 defined in a top surface of the rail 1106.

Figure 15:
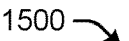
FIG. 15 illustrates an example of a mounting device, according to an example of the principles described herein.

FIG. 15 illustrates an example of a mounting system 1500, according to an example of the principles described herein. The mounting system 1500 of FIG. 15 may include any of the mounting devices 100, 902, depicted above in connection with FIGS. 1 through 13. The mounting system 1500 may include an L-shaped bracket engaged with a mounting device and a clamp such as, for example, the L-shaped bracket 802, mounting device 100, and clamp 804 of FIG. 8. The mounting system 1500 may secure a rail 1106 such as the rail 1106 depicted in FIGS. 11 and 12. The rail 1106 may include a channel 1402 defined in a top surface to allow for a stationary mount 1504. As similarly described above in connection with FIG. 14, the stationary mount 1504 may include a foot 1506 that may be used to couple other devices such as a photovoltaic panel assembly. The devices such as the photovoltaic panel assembly may be coupled to the foot 1506 via a fastening recess 1508. In one example, the fastening recess 1508 may include threads to allow a bolt or screw associated with the photovoltaic panel assembly, for example, to secure the photovoltaic panel assembly to the foot 1506. Further, in one example, the stationary mount 1504 may utilize a friction force between the stationary mount 1504 and the rail 1106 to keep the stationary mount 1504 in place along a length of the rail 1106. Further, the friction force may be overcome in order to move the position of the stationary mount 1504 along a length of the rail 1106.

Figure 16:
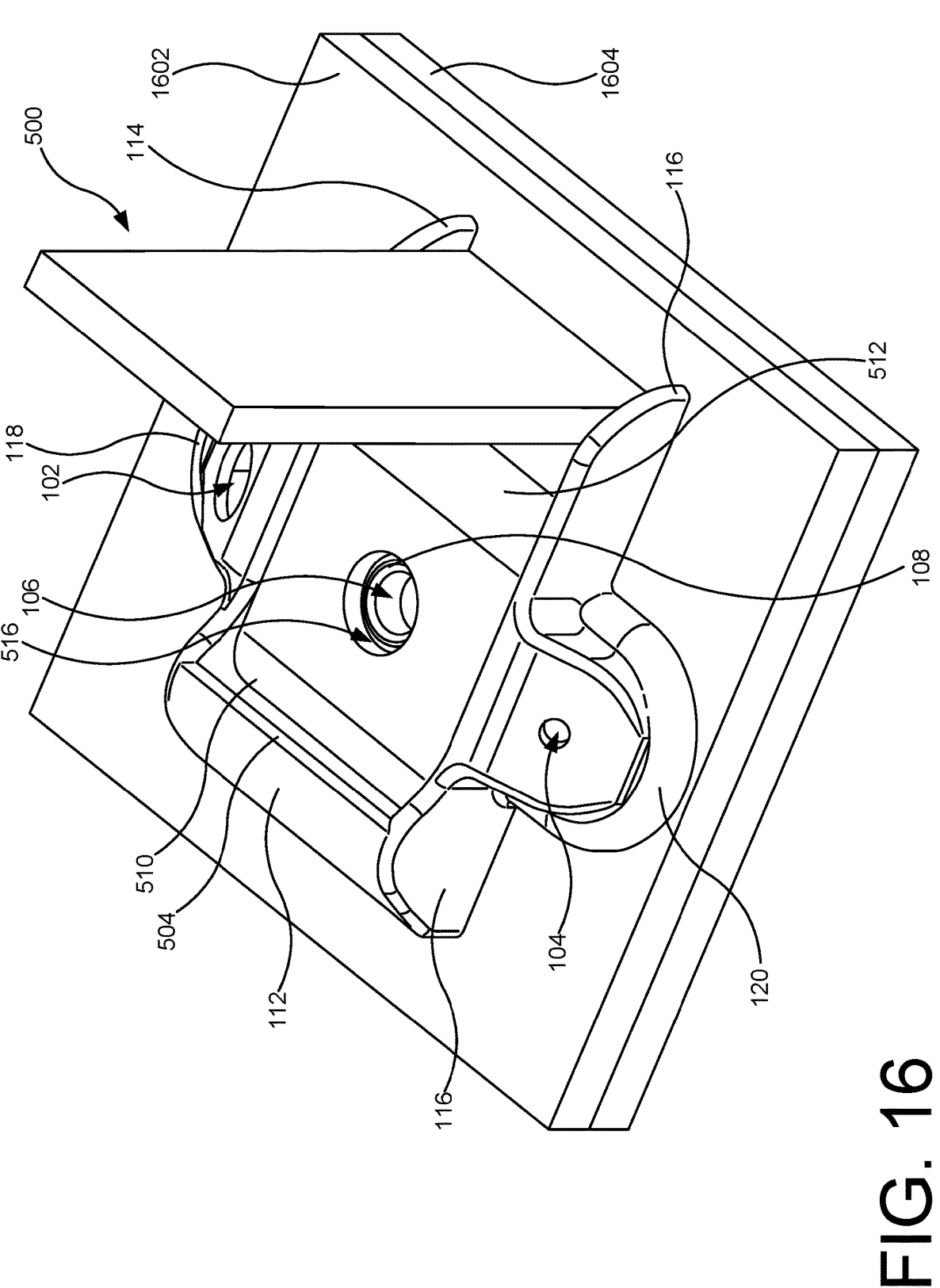
FIG. 16 illustrates a top, perspective view of the system of FIGS. 5 through 7 including a flashing layer and a structure layer, according to an example of the principles described herein.

FIG. 16 illustrates a top, perspective view of the system 500 of FIGS. 5 through 7 including a flashing layer 1602 and a structure layer 1604, according to an example of the principles described herein. Although the system 500 of FIGS. 5 through 7 are depicted and described in connection with FIG. 16, any of the examples of FIGS. 1 through 15 may be utilized in conjunction with the flashing layer 1602 described herein.

As mentioned above, the flashing layer 1602 may be located between the structure layer 1604 and the bottom of the mounting device 100. The fastener used to couple the mounting device 100 and L-shaped bracket 502 to the structure engages with the structure layer 1604 via the flashing layer 1602. The engagement of the fastening device with the flashing layer 1602 and the structure layer 1604 creates a hole in both the flashing layer 1602 and the structure layer 1604. The sealant introduced into the internal cavity 204 of the mounting device 100 may flow into the holes created in both the flashing layer 1602 and the structure layer 1604 due to the pressure provided on the sealant by the caulk gun. In this manner, the mounting device 100 and the ability to introduce sealant therein causes any holes created by the fastener to be sealed. Sealing of these holes ensures that any environmental elements such as precipitation and heat do not permeate the structure via the holes.

The examples described herein include the various brackets, clamps, objects, and other devices used to couple an end product to the structure. The brackets, clamps, objects, and other devices may be made of a metal or metal alloy. In one example, the brackets, clamps, objects, and other devices may be made using roll forming, extrusion, press braking, stamping, forging, and casting, among other types of metal forming.

Because the examples of FIGS. 1-16 utilize the use of a fastener that extends through an aperture in the bottom portion of the bracket, through an aperture defined in the mounting device 100, and into the structure, the use of the sealant introduced into the internal cavity 204 defined in the mounting device 100 using the first sealant aperture 102 and the second sealant aperture 104 defined in the mounting device 100 ensures a watertight seal at the point at which the fastener penetrates the surface of the structure.

Conclusion

The examples described herein provide a watertight and secure fixture of mounting devices to a structure. Introduction of the sealant into the internal cavity creates a watertight seal at the point at which the fastener penetrates the surface of the structure. With the above-described systems and methods, the mounting device may be coupled to any portion of a structure.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

What is claimed is:
1. A mounting system comprising:
a mounting device including:
an internal cavity defined in a side of the mounting device,
a first sealant aperture defined in the mounting device and opening into the internal cavity,
a second sealant aperture defined in the mounting device and opening into the internal cavity, the first sealant aperture and the second sealant aperture being in fluid communication when the mounting device is placed on a surface for use,
a first distended portion and a second distended portion, and
a first fastener aperture defined through the internal cavity;
a coupling bracket including a bottom portion, an underside surface of the bottom portion being correspondingly shaped in conformance with a shape of an outer surface of a central portion of the mounting device so as to be accommodated thereon when in use, and the bottom portion including a first ridge and a second ridge formed on a raised bridge portion; and
a fastener to couple the mounting device and the coupling bracket together via the first fastener aperture, wherein the first ridge and the second ridge engage with the first distended portion and the second distended portion, respectively, to secure the coupling bracket to the mounting device.

2. The mounting system of claim 1, wherein the coupling bracket further includes a vertical device coupling portion including a bracket aperture defined therethrough.

3. The mounting system of claim 2, wherein the bottom portion of the coupling bracket further includes a second fastener aperture disposed to align with the first fastener aperture in the mounting device, and wherein the second fastener aperture in the bottom portion of the coupling bracket and the first fastener aperture in the mounting device are sized to receive the fastener for coupling the mounting device and the coupling bracket to the surface.

4. The mounting system of claim 1, wherein the first sealant aperture is configured to receive a sealant material.

5. The mounting system of claim 4, wherein the second sealant aperture is configured to expel the sealant material through the second sealant aperture when the sealant material fills the internal cavity with the sealant material.

6. The mounting system of claim 4, wherein the sealant material seals around the fastener with respect to the surface to which the mounting system is secured via the fastener.

7. The mounting system of claim 1, wherein the coupling bracket further includes a clamp that is adjustably coupled along a height of the coupling bracket.

8. The mounting system of claim 1, wherein the coupling bracket further includes:

a first stanchion coupled to the bottom portion, a second stanchion coupled to the bottom portion opposite the first stanchion and rotatably coupled to the bottom portion, and a spring biasing the second stanchion towards the first stanchion.

9. The mounting system of claim 8, wherein the spring is formed on the mounting device.

10. The mounting system of claim 8, wherein the coupling bracket further includes:

a retention housing;

a nut defined within the retention housing;

a cylindrical stanchion threadingly coupled to the nut; and a spring-biased clamp coupled to the cylindrical stanchion, wherein adjustment of the cylindrical stanchion relative to the nut adjusts an elevation of the spring-biased clamp relative to the mounting device.

11. The mounting system of claim 1, wherein the mounting device is made of a plastic material.

12. The mounting system of claim 1, further comprising a flashing located between the mounting device and the surface, wherein the fastener engages with the surface via the flashing.

13. A mounting device comprising:

an internal cavity defined in a side of the mounting device;

a first sealant aperture defined in the mounting device and opening into the internal cavity;

a second sealant aperture defined in the mounting device and opening into the internal cavity, the first sealant aperture and the second sealant aperture being in fluid communication when the mounting device is placed on a surface for use;

a fastener aperture defined through the internal cavity; and a fastener to couple the mounting device to the surface via the fastener aperture, wherein a coupling bracket is configured to connect with the mounting device, the coupling bracket including:

a retention housing, a nut defined within the retention housing, a cylindrical stanchion threadingly coupled to the nut, and a spring-biased clamp coupled to the cylindrical stanchion, and wherein adjustment of the cylindrical stanchion relative to the nut adjusts an elevation of the spring-biased clamp relative to the mounting device.

14. The mounting device of claim 13, wherein the mounting device further includes a first distended portion and a second distended portion formed on the mounting device, the first distended portion and the second distended portion being shaped to engage with a first ridge and a second ridge formed on a raised portion of the coupling bracket, respectively, thereby engaging the coupling bracket with the mounting device.

15. The mounting device of claim 13, wherein the first sealant aperture is configured to receive a sealant material.

16. The mounting device of claim 15, wherein the second sealant aperture is configured to expel the sealant material through the second sealant aperture when the sealant material fills the internal cavity with the sealant material.

17. The mounting device of claim 16, wherein the sealant material seals the fastener with respect to the surface.

18. The mounting device of claim 13, wherein at least one of the first sealant aperture or the second sealant aperture includes a resealable membrane.

19. The mounting device of claim 13, wherein the second sealant aperture is smaller in diameter relative to the first sealant aperture.

\* \* \* \* \*